United States Patent
Karr et al.

(10) Patent No.: US 7,340,640 B1
(45) Date of Patent: Mar. 4, 2008

(54) SYSTEM AND METHOD FOR RECOVERABLE MIRRORING IN A STORAGE ENVIRONMENT EMPLOYING ASYMMETRIC DISTRIBUTED BLOCK VIRTUALIZATION

(75) Inventors: Ronald S. Karr, Sunnyvale, CA (US); Kalaivani Arumugham, Sunnyvale, CA (US); John A. Colgrove, Los Altos, CA (US); Poonam Dhavale, Sunnyvale, CA (US)

(73) Assignee: Symantec Operating Corporation, Cupertino, CA (US)

( * ) Notice: Subject to any disclaimer, the term of this patent is extended or adjusted under 35 U.S.C. 154(b) by 654 days.

(21) Appl. No.: 10/838,162

(22) Filed: May 3, 2004

Related U.S. Application Data

(60) Provisional application No. 60/467,645, filed on May 2, 2003.

(51) Int. Cl.
*G06F 11/00* (2006.01)
(52) U.S. Cl. .......................................... 714/6; 711/209
(58) Field of Classification Search ................... None
See application file for complete search history.

(56) References Cited

U.S. PATENT DOCUMENTS

| | | | |
|---|---|---|---|
| 5,649,152 A | 7/1997 | Ohran et al. | |
| 6,078,990 A | 6/2000 | Frazier | |
| 6,144,999 A | 11/2000 | Khalidi et al. | |
| 6,163,856 A | 12/2000 | Dion et al. | |
| 6,260,120 B1 * | 7/2001 | Blumenau et al. | 711/152 |
| 6,275,892 B1 | 8/2001 | Arnott | |
| 6,295,575 B1 * | 9/2001 | Blumenau et al. | 711/5 |
| 6,360,330 B1 | 3/2002 | Mutalik et al. | |
| 6,401,215 B1 | 6/2002 | Maddalozzo, Jr. et al. | |
| 6,442,551 B1 * | 8/2002 | Ofek | 707/10 |
| 6,505,307 B1 | 1/2003 | Stell et al. | |
| 6,529,944 B1 | 3/2003 | LeCrone | |
| 6,594,698 B1 | 7/2003 | Chow et al. | |
| 6,609,183 B2 | 8/2003 | Ohran | |
| 6,611,923 B1 | 8/2003 | Mutalik et al. | |

(Continued)

OTHER PUBLICATIONS

Microsoft Computer Dictionary, 4th Ed. Microsoft Press, 1999, p. 313.*

(Continued)

*Primary Examiner*—Christopher McCarthy
(74) *Attorney, Agent, or Firm*—Meyertons Hood Kivlin Kowert & Goetzel, P.C.; B. Noël Kivlin; Anthony M. Petro

(57) ABSTRACT

Systems and methods for performing recoverable mirroring in a storage environment employing asymmetrically distributed block virtualization. In one embodiment, the system may include a volume server, a first and a second host computer system, and a plurality of physical block devices. The volume server may be configured to aggregate storage in the plurality of physical block devices into a plurality of logical volumes, where a particular logical volume includes storage from at least two physical block devices, to make a first subset of the logical volumes available to the first host computer system for input/output, and to make a second subset of the logical volumes available to the second host computer system for input/output. The first subset and the second subset may be at least partially nonoverlapping, a given logical volume may be configured as a mirrored logical volume including a plurality of copies of a given data block.

24 Claims, 14 Drawing Sheets

U.S. PATENT DOCUMENTS

| | | | |
|---|---|---|---|
| 6,633,962 B1* | 10/2003 | Burton et al. | 711/163 |
| 6,691,245 B1 | 2/2004 | DeKoning | |
| 6,721,901 B1 | 4/2004 | McBrearty et al. | |
| 6,799,189 B2 | 9/2004 | Huxoll | |
| 6,799,255 B1* | 9/2004 | Blumenau et al. | 711/152 |
| 6,804,753 B1* | 10/2004 | Moody et al. | 711/163 |
| 6,826,580 B2 | 11/2004 | Harris et al. | |
| 6,845,395 B1* | 1/2005 | Blumenau et al. | 709/223 |
| 7,020,760 B2 | 3/2006 | Glider | |
| 7,051,182 B2* | 5/2006 | Blumenau et al. | 711/202 |
| 7,149,787 B1* | 12/2006 | Mutalik et al. | 709/217 |
| 7,171,514 B2* | 1/2007 | Coronado et al. | 711/112 |
| 2002/0083281 A1* | 6/2002 | Carteau | 711/161 |
| 2002/0124137 A1 | 9/2002 | Ulrich et al. | |
| 2003/0126107 A1* | 7/2003 | Yamagami | 707/1 |
| 2003/0131193 A1* | 7/2003 | Kodama et al. | 711/114 |
| 2003/0233518 A1* | 12/2003 | Yamagami et al. | 711/114 |
| 2004/0028043 A1 | 2/2004 | Maveli et al. | |

OTHER PUBLICATIONS

Wiebalck et al., "Fault-tolerant Distributed Mass Storage for LHC Computing," Proccedings of the 3rd IEEE/ACM International Symposium on Cluster Computing and the Grid, 2003, (8 pages).

"Network Appliance SnapMirror Software Brochure," Network Appliance, 2003, (2 Pages).

Thekkath, C., et al, "Frangipani: A Scalable Distributed File System," In Proceedings of the 16$^{th}$ ACM Symposium on Operating Systems Principles, Oct. 1997, 14 pages.

"VERITAS FlashSnap™ Pooint-In-Time Copy Solutions, Administrator's Guide 1.1," VERITAS Software Corporation, Aug. 2002, pp. i-78.

VERITTAS File System ™ 3.5, Administrator's Guide, Solaris, VERITAS Software Corporation, Aug. 2002, pp. i-176.

VERITAS Volume Manager™ 3.5, Administrator's Guide, HP-UX, VERITAS Software Corporation, Aug. 2002, pp. i-344.

U.S. Appl. No. 10/838,162 entitled "System And Method For Recoverable Mirroring In A Storage Environment Employing Asymmetric Distributed Block Virtualization", filed May 3, 2004.

U.S. Appl. No. 10/903,103, entitled "System and method for implementing volume sets in a storage system", filed Jul. 30, 2004.

U.S. Appl. No. 10/838,043, entitled "System and method for performing snapshots in a storage environment employing distributed block virtualization", filed May 30, 2004.

\* cited by examiner

SYSTEM AND METHOD FOR RECOVERABLE MIRRORING IN A STORAGE ENVIRONMENT EMPLOYING ASYMMETRIC DISTRIBUTED BLOCK VIRTUALIZATION

PRIORITY CLAIM

This application claims benefit of priority of provisional application Ser. No. 60/467,645, entitled "Asymmetric Distributed Block Virtualization in a Distributed Storage Management System," and filed on May 2, 2003.

BACKGROUND

1. Field of the Invention

This invention relates to data storage and, more particularly, to techniques for performing recoverable mirroring in data storage environments that employ asymmetric distributed block virtualization.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

However, not all data consumers may require or benefit from the same types of features that might be presented by the storage model. For example, some types of applications may require a high degree of data reliability but are not particularly performance sensitive, while the reverse may be true of other applications. Further, not all data consumers may require access to the same data. For example, a database application running on one server may require different data than an accounting application running on a different server. Requiring that all storage features (such as mirroring, striping, snapshots, etc.) and/or all data be available to each consumer in a complex storage environment may potentially result in suboptimal use of resources.

SUMMARY

Various systems and methods for performing recoverable mirroring in a storage environment employing asymmetrically distributed block virtualization are disclosed. In one embodiment, the system may include a volume server, a first and a second client computer system, and a plurality of physical block devices. The volume server may be configured to aggregate storage in the plurality of physical block devices into a plurality of logical volumes, where a particular logical volume includes storage from at least two physical block devices. The volume server may further be configured to make a first subset of the logical volumes available to the first client computer system for input/output, and to make a second subset of the logical volumes available to the second client computer system for input/output. The first subset and the second subset may be at least partially nonoverlapping, and a given logical volume may be configured as a mirrored logical volume including a plurality of copies of a given data block. The system may further include recovery functionality configured to place two of the plurality of copies of the given data block in a mutually consistent state if those two copies of the given data block are detected to be possibly inconsistent.

In one specific implementation of the system, each said copy of the given data block within the mirrored logical volume is stored on a respective block device. In another specific implementation, the system further includes recovery functionality configured to detect that two of said plurality of copies of the given data block are inconsistent and to responsively place the inconsistent copies in a mutually consistent state.

A method is further contemplated that in one embodiment may include aggregating storage in a plurality of physical block devices into a plurality of logical volumes, where a particular logical volume includes storage from at least two physical block devices. The method may further include making a first subset of the logical volumes available to a first client computer system for input/output, and making a second subset of the logical volumes available to a second client computer system for input/output, where the first subset the said second subset are at least partially nonoverlapping, and where a given logical volume is configured as a mirrored logical volume including a plurality of copies of a given data block. The method may further include detecting that two of the plurality of copies of the given data block are possibly inconsistent, and responsively placing the possibly inconsistent copies in a mutually consistent state.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Block Virtualization

Figure 1:
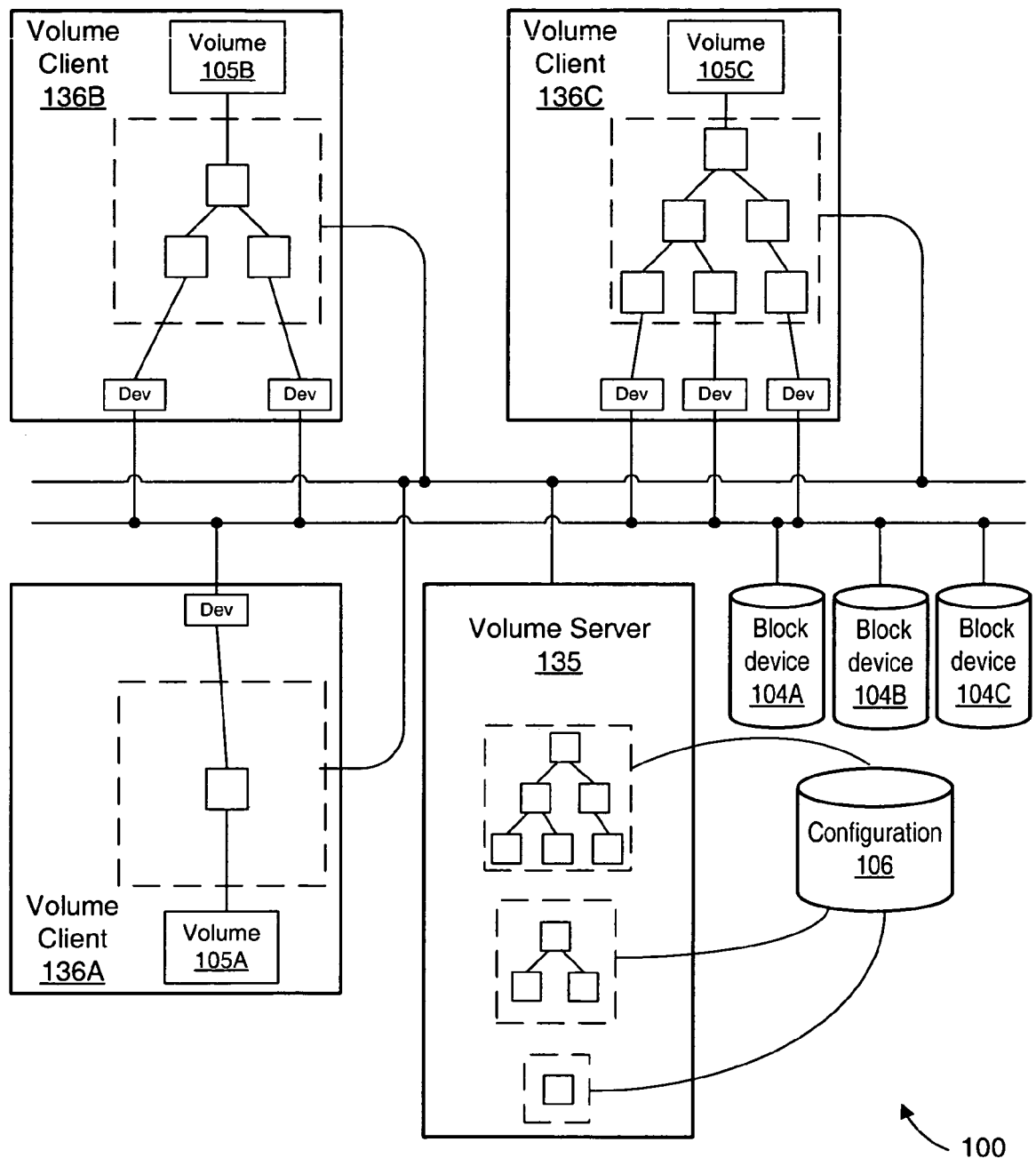
FIG. 1 is a block diagram illustrating one embodiment of a logical volume-based block virtualization system.

FIG. 1 illustrates a logical volume-based block virtualization system 100 according to one embodiment. In the illustrated embodiment, system 100 includes a plurality of block devices 104A-C (collectively, block devices 104) as well as a volume server 135 and a plurality of volume clients 136A-C (collectively, volume clients 136). Volume clients 136 may also be referred to herein as hosts 136. Volume server 135 is configured to obtain configuration information from a configuration database 106, and each of volume clients 136A-C is shown as having access to a respective volume 105A-C. Each of volumes 105 is associated with one or more logical storage objects, illustrated as a tree of logical objects.

Generally speaking, a block device 104 may comprise a hardware or software entity that provides a collection of linearly addressed data blocks that can be read or written. For example, in one embodiment a block device 104 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. Block devices presented by physical storage devices may also be referred to as physical block devices. In some embodiments, a physical block device may be presented by a storage device residing on a storage network, such as a Small Computer System Interface (SCSI) device presented to a Storage Area Network (SAN) using a Fibre Channel, Infiniband, or Internet Protocol (IP) interface. In some embodiments, a block device 104 may also be a logical or virtual storage device resulting from a mapping of blocks of one or more physical storage devices, as described in greater detail below. Such block devices may also be referred to as logical or virtual block devices.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device 104 may read or write blocks directly to the device, bypassing any file system that may be in use. In some embodiments, a block device 104 presented by an operating system for use by a consumer may present relatively few primitives through which the device may be manipulated. For example, in one embodiment a block device 104 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 104 that are physical storage devices, such as disks or tape drives, may be configured to present some form of SCSI interface, though other interfaces are possible and contemplated.

A volume manager, such as volume server 135, may introduce virtualization of blocks, creating some number of virtualized block devices out of one or more physical or logical block devices. (In some embodiments, physical storage devices such as disk arrays may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Generally speaking, a volume 105 (which may also be referred to herein as a logical volume) may comprise a virtualized block device that may be presented directly for use by a block device consumer, i.e., a file system or an application (such as a database application, for example) that can directly use block devices. A given volume 105 may be associated with several logical or physical block devices as a result of the block device virtualization just described. Each block device included in the logical organization of a given volume or virtualized block device may be referred to as a storage object or logical storage object. As noted previously, a given virtualized block device may include multiple layers of virtualization, depicted in FIG. 1 as a tree of storage objects.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. Such a disk driver may be generally unaware of block virtualization and may in some instances present a barrier to using some virtualization techniques, whereas a volume implementing various block virtualization features may be directly accessible by a consumer without the issues presented by such disk drivers.

Volume server 135 (which may also be referred to herein as a virtualization coordinator or a volume coordinator) may provide functions such as configuration management of virtualized block devices and distributed coordination of block device virtualization. For example, in one embodiment volume server 135 may be aware of the type and quantity of physical storage devices, such as block devices 104, that are available within system 100. In response to a request to configure a virtual block device, for example according to a desired set of virtualization features, volume server 135 may be configured to build a volume description that describes how a collection of storage objects compliant with the desired features maps to underlying physical block devices. The volume description identifying a particular volume 105 may be distributed to one or more volume clients 136. In one embodiment, such a volume description may be a tree of storage objects as illustrated in FIG. 1 and described in greater detail below in conjunction with the description of FIG. 2.

The structure of the volume 105, for example as indicated by its corresponding storage object tree, may indicate to a given volume client 136 how the volume relates to one or more underlying physical storage devices. In one embodiment, the leaf nodes of such a tree may correspond to one or more physical block devices such as block devices 104, and the root node of such a tree may be a logical block device through which the volume is accessed by a consumer. Distribution of a virtualized block device as a volume to one or more clients may also be referred to as distributed block virtualization. In some embodiments, after volume server 135 has distributed a volume description of a given virtual block device to a given volume client 136 as a particular volume 105, the given volume client 136 may interact with that particular volume 105 to read and write blocks without further involvement on the part of volume server 135. That is, the given volume client 136 may use the structure of the particular volume 105 to transform I/O requests generated by various consumers of that volume 105 into I/O requests directed to specific physical storage devices, such as block devices 104.

In the illustrated embodiment, volume server 135 reads and updates configuration information corresponding to volume descriptions (such as a storage object tree corresponding to a given volume) from a configuration database 106. The configuration information in the database 106 establishes the logical configuration of data on the physical storage devices 104 (e.g., block devices 104A, 104B, and 104C). For example, such configuration information may indicate how various logical and physical block devices are divided, striped, mirrored, etc. In one embodiment, the configuration information may be stored on the devices (e.g., block devices 104A, 104B, and 104C) that are being virtualized. It is contemplated that in some embodiments, configuration of a given virtualized block device may be managed and/or stored in data structures other than trees of objects. For example, in one embodiment, tables may be used to map virtual block devices to physical storage.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 105 is distributed to more than one volume client 136, any changes that affect the structure of the given volume 105 may need to be coherently coordinated among the relevant volume clients 136. In one embodiment volume server 135 may be configured to coordinate such changes. For example, volume server 135 may be configured to coordinate quiescence of those volume clients 136 to which the given volume 105 is distributed, in order to temporarily suspend activity to given volume 105. Volume server 135 may further distribute changes to the structure of given volume 105 to relevant volume clients 136 in an effectively atomic fashion, such that either all or none of the relevant volume clients 136 receive the changes.

As described in greater detail below in conjunction with the descriptions of FIGS. 11-14, volume clients 136 may be any type of device capable of interacting with a given volume 105 for data storage and retrieval. For example, in one embodiment a volume client 136 may be a server computer system, including one or more processors and one or more system memories, where the server system is configured to execute software such as one or more operating systems and/or applications. In another embodiment, a volume client 136 may be a client computer system configured to access a given volume 105 via a separate server computer system. In other embodiments, a volume client 136 may be an embedded system configured to use application specific integrated circuit (ASIC) or field-programmable gate array (FPGA) technology to execute operations whereby a given volume 105 may be accessed. Numerous other configurations of volume clients 136 are possible and contemplated. Additionally, as described in greater detail below, in some embodiments it is contemplated that the function of volume server 135 may be implemented via one or more of volume clients 136, whereas in other embodiments volume server 135 may be implemented via hardware distinct from volume clients 136.

In some embodiments of system 100, volume server 135 may be configured to distribute all virtualized block devices as volumes 105 to each volume client 136 within the system. Such embodiments may be referred to as symmetric distributed block virtualization systems. In some instances, however, symmetric distributed block virtualization may be difficult to implement or may negatively impact system performance. Generally, implementing uniform access to a set of physical devices as required for symmetric virtualization may result in excessively interconnected devices, which may add a burden to the configuration of storage devices, may increase the administrative burden of ensuring interconnectivity, and may reduce security in that more systems than require access to storage devices may be given access to storage devices. For example, in typical volume clients 136, operating system resources (e.g., data structures such as pointers or device handles) are allocated to the management and control of each volume 105 presented to the client for use. In very large-scale systems with many volume clients 136 and volumes 105, distributing each volume to each client may deplete the operating system resources dedicated to volume management and may increase the complexity of performing I/O accesses to volumes in general. For example, having a large number of volumes present may require the operating system to index large tables of volume-specific information for each I/O access that occurs. Further, in some embodiments of system 100, volume clients 136 may have heterogeneous functions such that a given client may access some volumes 105 more frequently than others. For example, some of volume clients 136 may be application servers configured to perform distinct functions requiring access to different types of data.

In the illustrated embodiment, volume server 135 is configured to distribute different sets of volumes 105 to different volume clients 136. That is, volume 105A is distributed to volume client 136A, volume 105B is distributed to volume client 136B, and volume 105C is distributed to volume client 136C. Generally speaking, systems in which subsets of the volumes 105 defined by volume server 135 are distributed to volume clients 136, and in which two or more subsets are at least partially nonoverlapping (i.e., in which at least one volume 105 is not common to two or more volume clients 136) may be referred to as asymmetric distributed block virtualization systems. (It is noted that distributed block virtualization systems also may be considered asymmetric in terms of how the virtualization is controlled. That is, in a system that is asymmetric in the control sense, the management of block virtualization that is performed by volume server 135 may be distinctly separated from input/output (I/O) activity to the virtualized block devices, such as performed by volume clients 136. For example, volume server 135 may be a completely separate system from volume clients 136 as illustrated in FIG. 1. By contrast, in a system that is symmetric in the control sense, one of the client systems configured to perform I/O to a virtualized block device may also be configured to manage block virtualization on behalf of the other client systems.)

Figure 2:
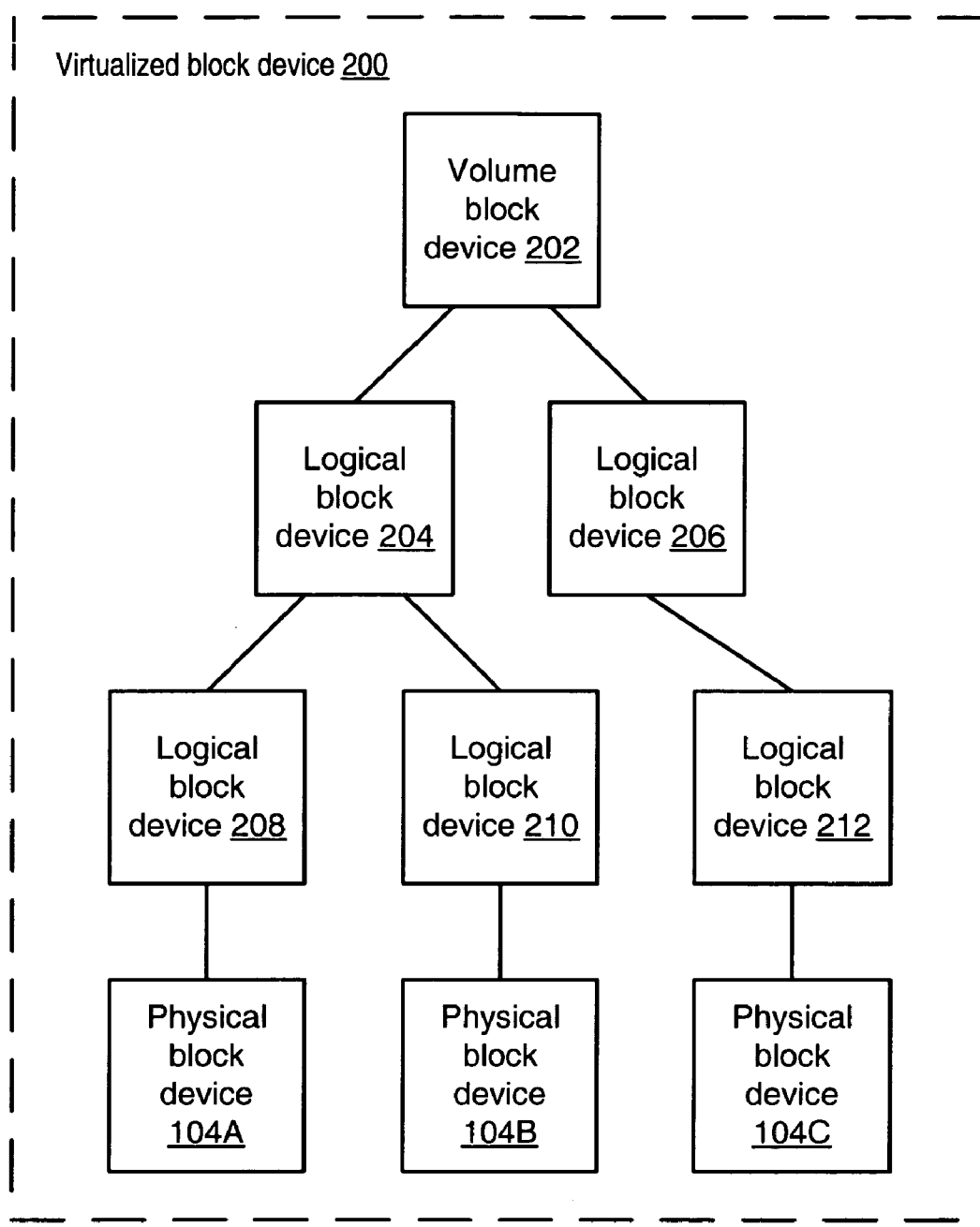
FIG. 2 is a block diagram illustrating one embodiment of a virtualized block device that may be presented as a volume.

One embodiment of a virtualized block device that may be presented as a volume 105 to a volume client 136 is illustrated in FIG. 2. In the illustrated embodiment, virtualized block device 200 includes a volume block device 202 that includes logical block devices 204 and 206. In turn, logical block device 204 includes logical block devices 208 and 210, while logical block device 206 includes logical block device 212. Logical block devices 208, 210, and 212 map to physical block devices 104A-C of FIG. 1, respectively.

Virtualized block device 200 may in its entirety represent the structure of the data comprising a given volume 105, which data may be physically stored in physical block devices 104A-C. Volume block device 202 may be configured to be mounted within a file system or presented to an application or other volume consumer as the interface through which the consumer may interact with given volume 105. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally a given block device may be configured to map the logical block spaces of subordinate block devices into its logical block space in various ways in order to realize a particular virtualization function. For example, in one embodiment, virtualized block device 200 may be configured as a mirrored volume, in which a given data block written to virtualized storage device 200 is duplicated, and each of the multiple copies of the duplicated given data block are stored in respective block devices. In one such embodiment, volume block device 202 may be configured to receive an operation to write a data block from a consumer of corresponding volume 105. Volume block device 202 may duplicate the write operation and issue the write operation to both logical block devices 204 and 206, such that the block is written to both devices. In this context, logical block devices 204 and 206 may be referred to as mirror devices. In various embodiments, volume block device 202 may read a given data block stored in duplicate in logical block devices 204 and 206 by issuing a read operation to one mirror device or the other, for example by alternating devices or defaulting to a particular device. Alternatively, volume block device 202 may issue a read operation to multiple mirror devices and accept results from the fastest responder.

As described above and shown in FIG. 2, in some embodiments a virtualized block device 200 may employ multiple layers of virtualization. For example, in the embodiment described above where logical block devices 204 and 206 function as mirror devices, it may be the case that underlying physical block devices 104A-C have dissimilar performance characteristics; specifically, devices 104A-B may be slower than device 104C.

In order to balance the performance of the mirror devices, in one embodiment, logical block device 204 may be implemented as a striped device in which data is distributed between logical block devices 208 and 210. For example, even- and odd-numbered blocks of logical block device 204 may be mapped to logical block devices 208 and 210 respectively, each of which may be configured to map in turn to all or some portion of physical block devices 104A-B respectively. In such an embodiment, block read/write throughput may be increased over a non-striped configuration, as logical block device 204 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 104C may employ a different block size than logical block device 206. In such an embodiment, logical block device 212 may be configured to translate between the two physical block sizes and to map the logical block space define by logical block device 206 to the physical block space defined by physical block device 104C. In some instances, the logical block space of logical block device 212 need not be contiguously mapped to blocks of physical block device 104C; an arbitrary mapping may be used.

Numerous other possible configurations of block devices are contemplated that may incorporate more or fewer layers of virtualization to realize within a given instance of virtualized block device 200 virtualization functions similar to or different from those described above. For example, volume block device 202 may employ a greater number of mirror devices, striping may occur higher in the hierarchy than mirroring, certain logical block devices may be configured to perform snapshots of other devices, certain logical block devices may span multiple physical block devices, etc.

Mirrors and Mirror Recovery in Distributed Block Virtualization

Mirrored volumes, in which multiple copies of data blocks may be stored on respective logical or physical block devices, may be configured within a given virtualized block device 200 as described above, and symmetrically or asymmetrically distributed to various volume clients 136 by a volume server 135 as described above. Generally, data mirroring may be employed to increase redundancy, such that in the event of loss or corruption of one copy of a given data block, another copy may be available. In some embodiments, the respective logical block devices (i.e., mirror devices) associated with mirrored copies of data blocks may map onto a single physical block device. However, to increase reliability in the event of failure of a given physical block device or a client associated with a particular physical block device, in some embodiments mirror devices within a given virtualized block device 200 may be configured to map to distinct physical block devices and/or separate clients.

In general, once an operation to write a given data block in a mirrored volume completes, all mirrored copies of the written data block should have identical values. However, a failure of a client or a logical or physical block device may occur during processing of a write operation such that some mirrored copies of the written data block reflect the write operation while others do not. Alternatively, a mirrored copy of a data block could be spontaneously corrupted due to a device failure, such as a disk crash, that is unrelated to any write activity to the data block. Regardless of the cause, if any two mirrored copies of a given data block in a mirrored volume are not identical, those data block copies (as well as the mirrored volume) may be said to be in an inconsistent state.

Figure 3:
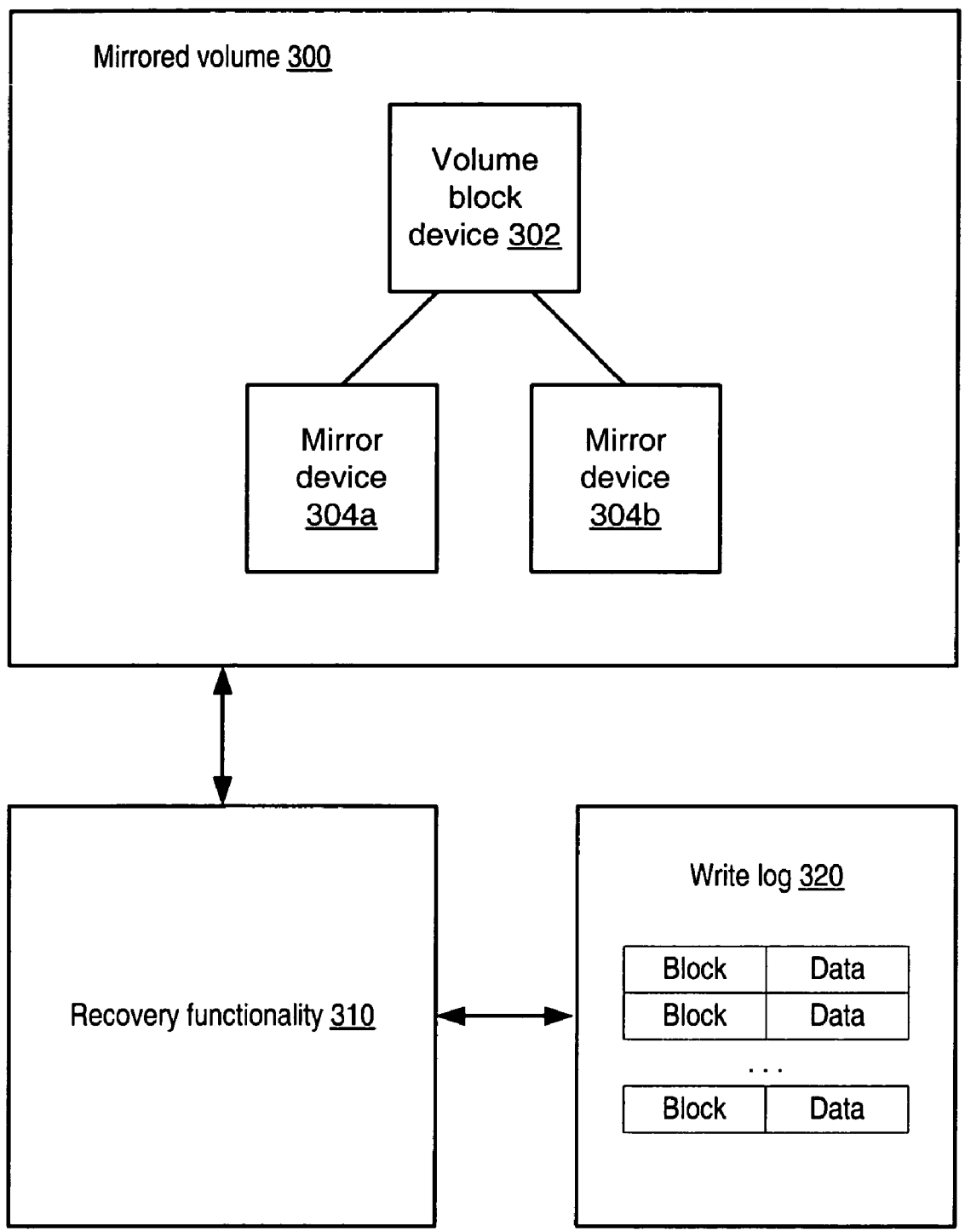
FIG. 3 is a block diagram illustrating a mirrored volume and associated recovery functionality, according to one embodiment.

In some embodiments, a mirrored volume that has become inconsistent may be recovered by placing the mirrored copies of any inconsistent data blocks in a mutually consistent state. FIG. 3 illustrates one embodiment of a mirrored volume and associated recovery functionality. Mirrored volume 300 includes a volume block device 302 and mirror devices 304a and 304b. Recovery functionality 310 is configured to interact with mirrored volume 300 as well as write log 320.

Mirrored volume 300 may be illustrative of any of the volumes 105A-C illustrated in FIG. 1. Specifically, mirrored volume 300 may be a virtualized block device that includes multiple logical or physical block devices. In the illustrated embodiment, mirrored volume 300 includes volume block device 302 as a logical block device. Mirror devices 304a and 304b may be logical or physical block devices or a combination of these, where each mirror device 304 is configured to store a respective copy of a data block mapped by volume block device 302. It is contemplated that in other embodiments, mirrored volume 300 may have additional structure and hierarchy, such as in the example configuration of virtualized block device 200 of FIG. 2 described above. It is also contemplated that in some embodiments, more than two mirror devices 304 may be employed.

Inconsistency of a given data block among mirror devices 304 may be detected in a number of ways. In one embodiment, mirrored volume 300 may be configured to receive block write operations from a volume consumer, such as an application or a file system, and to duplicate received write operations such that each mirror device 304 receives a operation to update its respective copy of the targeted data block. In such an embodiment, mirrored volume 300 may be configured to wait until each mirror device 304 indicates that it has successfully performed its write operation before notifying the volume consumer that the block write operation has completed. If one or more mirror devices 304 fail to indicate write success, mirrored volume 300 may assume a failure has occurred and that the corresponding data block may be inconsistent. In the case of block read operations received from a volume consumer, mirrored volume 300 may be configured in one embodiment to read each copy of the specified data block from each mirror device 304 and to compare each copy. If any two copies of the specified data block are found to disagree, mirrored volume 300 may assume a failure has occurred and that the corresponding data block may be inconsistent.

In another embodiment, inconsistency may be detected independently of particular block read or write activity from a volume consumer. For example, mirrored volume 300 may be configured to intermittently examine the contents of each mirror device 304 to detect inconsistency. Alternatively, functionality external to mirrored volume 300, such as recovery functionality 310 or volume server 135 of FIG. 1, may be configured to conduct such an examination. In various embodiments, such functionality may execute on the same volume client 136 as the client to which mirrored volume 300 has been distributed by volume server 135, or it may execute on a different volume client 136. If mirrored volume 300 has been distributed to multiple volume clients 136 for use by various volume consumers, then the various types of consistency checks just described may be performed independently by each of the multiple volume clients 136 in some embodiments, or delegated to a particular volume client 136 in other embodiments.

Detecting when actual inconsistencies occur, such as described above, may degrade performance in some instances. For example, checking each mirror copy on a read operation may require waiting for each mirror device to respond and then comparing all the results, which may add considerable latency to the read operation. In some embodiments, possible rather than actual inconsistencies may be detected. For example, in embodiments utilizing the mirror logging or bitmap mechanisms described below, information about recent block write activity may be retained for a substantial period of time (i.e., substantially longer than the expectation for a write to normally complete). In case of a system crash or a temporary failure of a particular mirror (e.g., due to a transient interconnect failure between a client and a physical storage devices), those blocks indicated as being most recently written may be considered possible candidates to be inconsistent, and all of the indicated blocks may be recovered without regard to their actual inconsistency. It is noted that in general, the set of possibly inconsistent blocks or regions as indicated by recent write activity entirely includes the set of actually inconsistent blocks or regions, in the common case where actual inconsistencies occur due to a failure of a given mirror write to complete. It is further noted that other, relatively uncommon actual inconsistencies not reflected in recent write activity may occur, such as due to data corruption during data transfer or on the storage medium itself.

If mirror inconsistency has been detected by an entity other than recovery functionality 310, recovery functionality 310 may be notified of the inconsistency. Recovery functionality 310 may also be configured to restore the consistency of mirrored volume 300 regardless of what entity detects inconsistency. In the embodiment of FIG. 3, recovery functionality 310 may be configured to interact with write log 320 to place inconsistent mirrored copies of blocks in a mutually consistent state.

In the illustrated embodiment, write log 320 is configured to store data associated with each of a plurality of block write operations, including the data identifying the block to be written (e.g., a block number or address) as well as the data to be written to the block. In some embodiments, write log 320 may be configured to store additional information about a given block write operation, such as timestamps or additional operation parameters. In one embodiment, write log 320 may be stored within any form of nonvolatile storage that is configured to retain a given value until that value is deliberately overwritten or replaced. For example, nonvolatile storage may include memory media such as nonvolatile RAM (NVRAM or Flash RAM), electrically erasable programmable ROM (EEPROM), or any other solid-state storage technology. Nonvolatile storage may also include magnetic or optical mass storage devices such as hard disks, tape, CD, DVD, etc. In some embodiments, write log 320 may be implemented within one or more of block devices 104, within one or more of volume clients 136, within volume server 135, or within another device attached to system 100 of FIG. 1.

When mirrored volume 300 receives a block write operation, write log 320 may be configured to store the aforementioned data regarding the operation. Subsequently, if recovery functionality 310 is notified of a mirror inconsistency, recovery functionality 310 may retrieve write operation data associated with the inconsistent data blocks from write log 320, and may reissue the associated write operation(s) and data to mirrored volume 300. If more than one logged write operation is associated with an instance of inconsistency, in one embodiment recovery functionality 310 may be configured to reissue the logged write operations in the order they originally occurred, for example according to a stored timestamp. When a mirror inconsistency occurs due to a transient failure of one or more mirror devices 304, reissuing the corresponding write operations in a manner similar to their original issuance may restore volume consistency.

In some embodiments, some write operations logged within write log 320 may be deleted to make room for newer write operations. For example, write operations may be deleted from write log 320 after a given period of time has elapsed since they were first issued. Alternatively, write operations may be deleted from write log 320 after the corresponding blocks of all mirror devices 304 have been verified as successfully written. Additionally, if mirrored volume 300 is distributed to more than one volume client 136 for access, in some embodiments write log 320 may be replicated to reflect the write activity of each volume client 136, while in other embodiments multiple volume clients 136 may coordinate for access to a single instance of write log 320.

Logging of writes as shown in FIG. 3 and described above may provide not only for recovery of consistency of mirrored volume 300, but for correctness of the data content of mirrored volume 300 with respect to write operations. That is, by reissuing logged write operations, recovery functionality 310 may restore consistency in a way that preserves the effects of the logged write operations. However, logging write operations may involve considerable complexity and computational overhead in some embodiments, for example in tracking write operations to be logged and selecting logged operations to be reissued in case of inconsistency.

In some embodiments, it may be sufficient to restore consistency of mirrored volume 300 without preserving the effects of logged write operations and incurring the complexities associated with logging. For example, if inconsistency is detected, recovery functionality 310 may be configured to responsively select one of mirror devices 304 and copy its contents to each other mirror device 304. Following such copying, mirror devices 304 may once again be consistent, and separate measures may be undertaken to consider the effects of any block writes not reflected as a result of this recovery process. However, if mirrored volume 300 is large, copying the entire contents of a given mirror device 304 to each other mirror device 304 may take a substantial amount of time and bandwidth.

Figure 4:
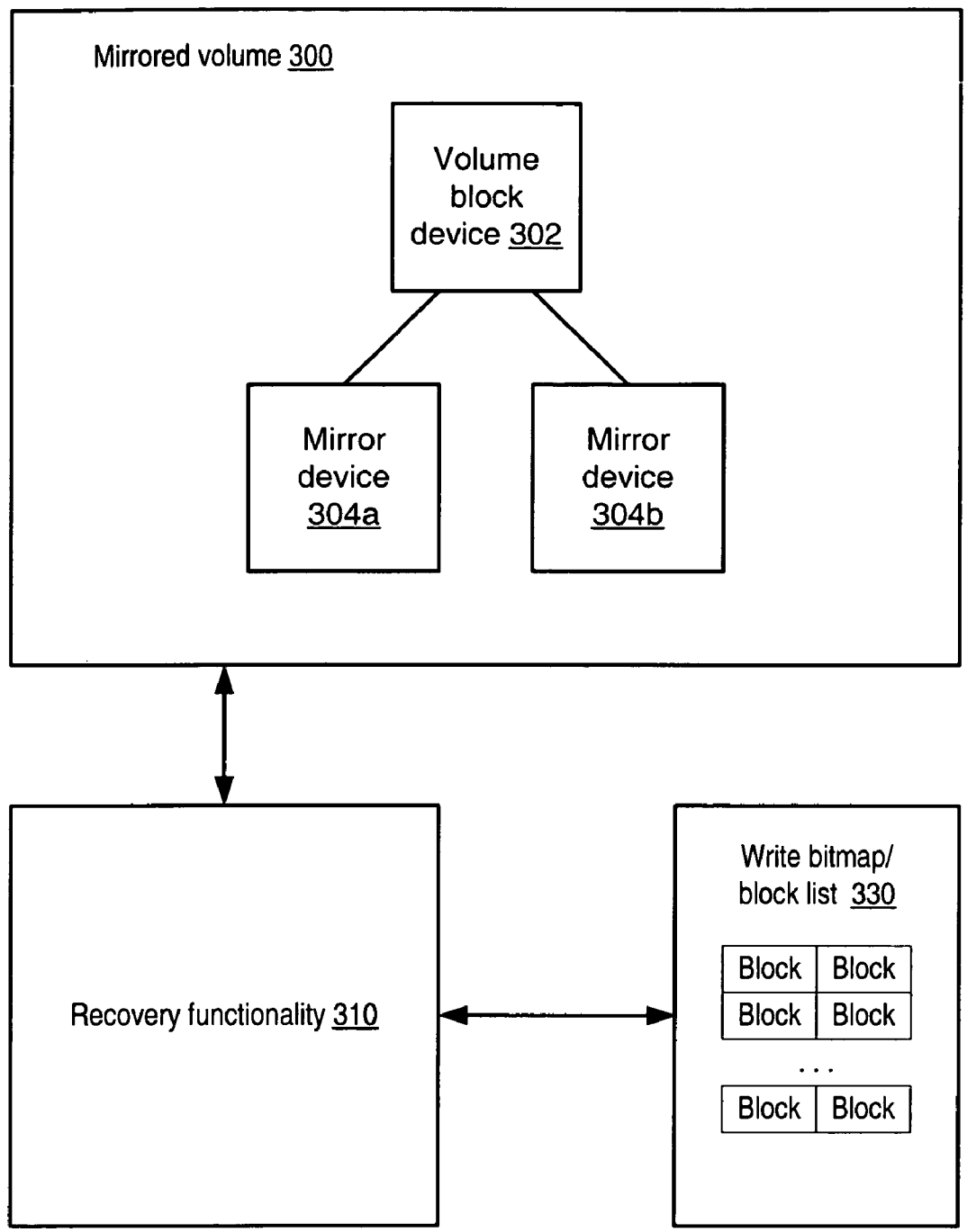
FIG. 4 is a block diagram illustrating a mirrored volume and associated recovery functionality, according to another embodiment.

FIG. 4 illustrates another embodiment of a mirrored volume and associated recovery functionality. As in the embodiment shown in FIG. 3 and described above, in the embodiment of FIG. 4 mirrored volume 300 includes a volume block device 302 and mirror devices 304a and 304b. In the embodiment of FIG. 4, recovery functionality 310 is configured to interact with mirrored volume 300 as well as write bitmap 330.

In one embodiment, write bitmap 330 may include a plurality of bits, each of which may correspond to a particular data block of mirrored volume 300. For example, if mirrored volume 300 presents N logical block indexed from 0 to N−1, in one embodiment write bitmap 330 may include N corresponding bits ordered from 0 to N−1. In other embodiments, write bitmap 330 may explicitly store block numbers or indexes rather than rely on the ordered correspondence of each bit to a block of mirrored volume 300; in such embodiments, write bitmap 330 may be alternatively referred to as write block list 330. Additionally, it is contemplated that in some embodiments, a given entry of write bitmap 330 may correspond to multiple blocks, which may also be referred to herein as a region.

When a write block operation is received by mirrored volume 300 by a volume consumer, in the illustrated embodiment, the bit corresponding to the block or blocks targeted by the write operation may be asserted within write bitmap 330. In an alternative embodiment, the block number of the targeted block may be stored within write block list 330. In some embodiments, write bitmap/block list 330 may be stored in nonvolatile memory, as described above with respect to write log 320 of FIG. 3.

Subsequently, if recovery functionality 310 is notified of a mirror inconsistency, it may consult write bitmap/block list 330 to identify those blocks within mirrored volume 300 that are indicated as having been written. Recovery functionality 310 may then select one of mirror devices 304 and copy those of its blocks that have been identified via write bitmap/block list 330 to each other mirror device 304. In many cases, the number of data blocks identified within write bitmap/block list 330 may be far smaller than the total number of data blocks defined within mirrored volume 300. In such cases, recovering consistency by copying only recently written blocks may be substantially faster than copying all blocks of a given mirror device 304.

In some embodiments, some asserted entries within write bitmap/block list 330 may be intermittently cleared or invalidated, such that bitmap/block list 330 reflects only more recent and/or unverified block write operations. For example, a given entry of bitmap/block list 330 may be cleared after a given period of time has elapsed since the corresponding write operation was first issued. Alternatively, such an entry may be cleared after the corresponding blocks of all mirror devices 304 have been verified as successfully written. Additionally, if mirrored volume 300 is distributed to more than one volume client 136 for access, in some embodiments bitmap/block list 330 may be replicated to reflect the write activity of each volume client 136, while in other embodiments multiple volume clients 136 may coordinate for access to a single instance of bitmap/block list 330.

Numerous other embodiments employing variations on using stored state such as logs, lists, and/or bitmaps in mirror recovery are possible and contemplated. For example, in one embodiment, a bitmap similar to bitmap 330 may be provided for each mirror device 304 within mirrored volume 300, such that in the event of volume inconsistency, a given mirror device 304 may be identified via its respective bitmap as having recently written its copy of a given data block or not. In another similar embodiment, such per-mirror-device bitmaps 304 may be separately allocated for each write operation received by mirrored volume 300, such that mirrored blocks specific to a given block write operation may be recovered without fully logging each write operation for reissue as in the embodiment of FIG. 3. In some embodiments, several of the aforementioned techniques may be combined. For example, in one embodiment writes to mirrored devices may be logged and, if necessary, used for recovery as described above. If an entry is deleted from the log, the corresponding regions or blocks may be indicated in a bitmap. If recovery is needed and the corresponding write log entries no longer exist, the bitmap may be used for recovery as described above.

It is noted that in some embodiments, the logging and bitmap techniques just described may each present different performance and system complexity considerations. For example, in a given embodiment employing write logging, a block write may be indicated as complete to the write issuer immediately after the write is logged, or after the write to all mirrors has finished. The latter approach may be more conservative, but may also incur higher latency than the former. Further, indicating write completion immediately after a log write may have a lower latency than performing a bitmap update followed by writes to all mirrors, but performing a log update followed by writes to all mirrors may have a higher latency than a bitmap update followed by writes to all mirrors. In some embodiments, logging schemes may use more storage bandwidth than bitmap-based schemes owing to a greater quantity of information being stored. In such embodiments, logging schemes may thus have somewhat worse write throughput than bitmap-based schemes. Additionally, in some logging embodiments, if writes are indicated complete immediately following a log write, reads to blocks which have been logged but not written to the mirrors may be required to either be delayed or read from the log. This may increase complexity in some embodiments where mirrored volumes are written concurrently by several systems (such as with a direct access shared file system or a direct access shared database, for example). For example, considerable messaging overhead among the multiple systems may be needed in order to avoid the overhead of logging and writing to the mirrors. Also, if multiple systems produce writes to the shared mirrored volume, log writes to the same block originating from two systems may either be ordered, or the earlier write may be discounted, such as by ignoring or invalidating it.

Figure 5:
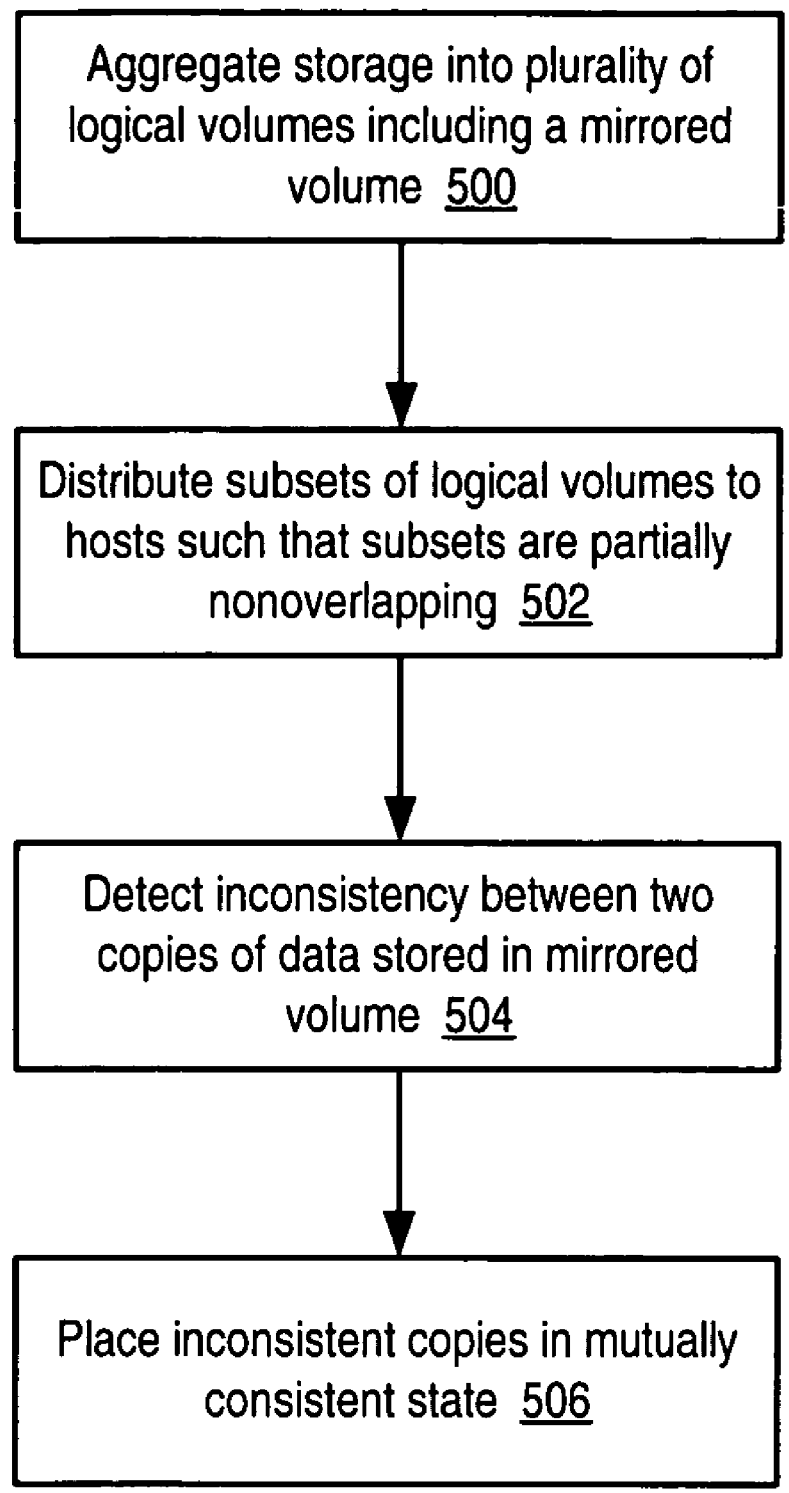
FIG. 5 is a flow diagram illustrating one embodiment of a method of mirroring storage and recovering mirror consistency in a system employing asymmetric block virtualization.

One embodiment of a method of mirroring storage and recovering mirror consistency in a system employing asymmetric block virtualization is illustrated in FIG. 5. Referring collectively to FIG. 1 through FIG. 5, operation begins in block 500 where storage in a plurality of block devices is aggregated into a plurality of logical volumes, where a particular logical volume includes storage from at least two physical block devices, and where a given logical volume is configured as a mirrored volume including a plurality of copies of a given data block. For example, in one embodiment volume server 135 may organize storage from a plurality of physical block devices 104 into a plurality of virtualized block devices 200 that may be presented as a plurality of volumes 105, where a particular volume 105 may include storage from several physical block devices 104. Further, one volume 105 may be a mirrored volume such as illustrated in FIG. 3 or 4, for example.

Following aggregation of storage into logical volumes, a first subset of the logical volumes may be distributed to a first client computer system, and a second subset of the logical volumes may be distributed to second client computer system, where the first and second subsets are at least partially nonoverlapping (block 502). For example, volume manager 135 may distribute one volume 105A to a particular volume client 136A and a second volume 105B to another volume client 136B.

Subsequent to distribution of logical volumes, inconsistency may be detected between two copies of data stored within a mirrored volume (block 504). For example, in one embodiment, a particular volume client 136 of a mirrored volume 300 may be configured to detect inconsistency as described above. Alternatively, inconsistency may be detected by recovery functionality 310 or volume server 135 in various embodiments.

Following detection of inconsistency, the inconsistent blocks may be placed in a mutually consistent state (block 506). For example, in one embodiment recovery functionality 310 may use write log 320 to reissue write operations to mirrored volume 300 in order to restore consistency. In another embodiment, recovery functionality 310 may cause a given mirror device 304 to be selected and copied to each other mirror device 304, or may use write bitmap/block list 330 to copy only recently written blocks of the given mirror device.

Snapshots in Distributed Block Virtualization

Snapshot volumes may also be configured within systems employing virtualized block devices 200 that are symmetrically or asymmetrically distributed to various volume clients 136 by a volume server 135 as described above. Generally speaking, a snapshot of data, however the data may be stored, may be a copy of the data made at or around a given point in time, which may be referred to as the snapshot effective time. That is, a snapshot of data may be a fixed image of the data as of a point or range in time. In some storage system embodiments, snapshots may be used to create archives of data, for example at hourly or daily intervals, which archives may be made available online to users for quick recovery of data and/or transferred to archival media such as tape for longer-term storage.

Figure 6A:
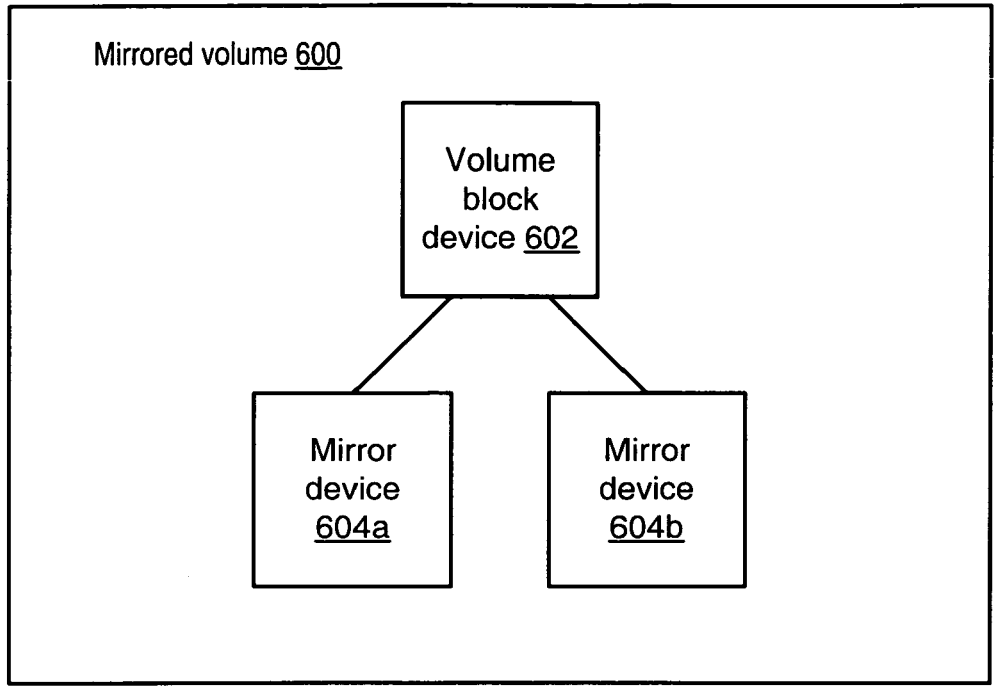
FIGS. 6A-B are block diagrams illustrating one embodiment of a system configured to perform a data snapshot using a mirror-and-break-off technique.
Figure 6B:
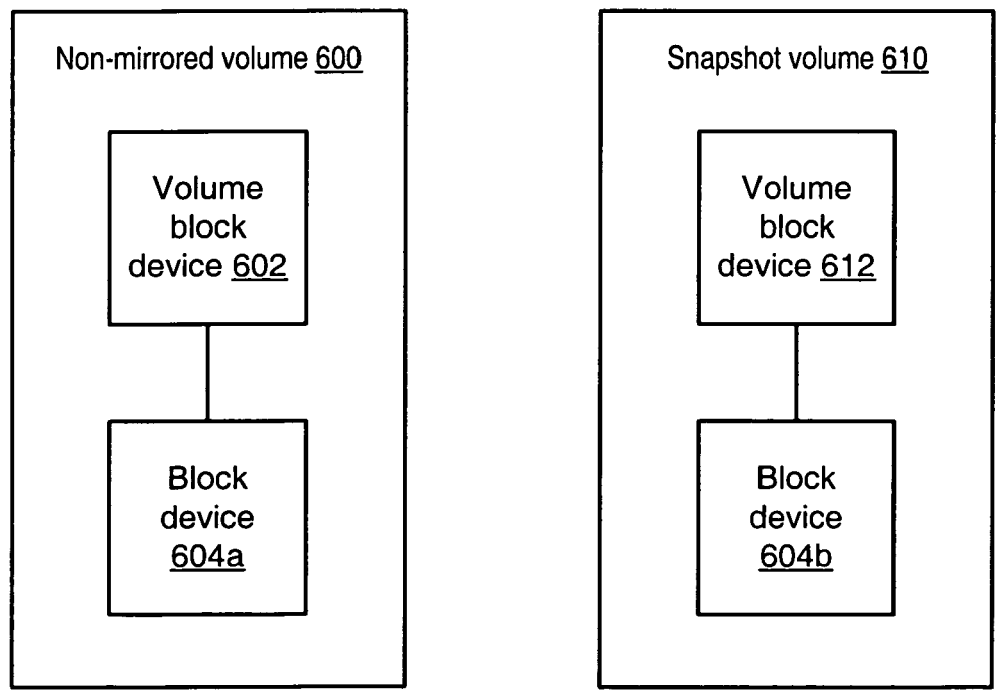

One technique for creating a snapshot of a given volume may be referred to as the mirror-and-break-off technique, of which one embodiment is illustrated in FIGS. 6A-B. In the illustrated embodiment of FIG. 6A, a mirrored volume 600 is configured to include a volume block device 602 and mirror devices 604a and 604b. Mirrored volume 600, volume block device 602 and mirror devices 604a-b may be each be illustrative of mirrored volume 300, volume block device 302 and mirror devices 304a-b, respectively, as described above in conjunction with the descriptions of FIGS. 3 and 4. As noted above, in some embodiments an arbitrary number of mirror devices 604 may be employed. Mirrored volume 600 may be an example of a virtualized block device configured by a volume server 135 and distributed to one or more volume clients 136 in a symmetric or asymmetric fashion, such as described above with respect to FIGS. 1 and 2.

In the illustrated embodiment, mirrored volume 600 may be configured, such as by volume server 135, by modifying a non-mirrored volume in response to a request to create a snapshot using the mirror-and-break-off technique. For example, mirror device 604a may already exist within a non-mirrored volume as a logical or physical block device at the time a snapshot request occurs. Responsively, volume server 135 may add a logical or physical device 604b to volume 600 and configure the volume to function as a mirror. In this case, a period of time may elapse while data is copied to newly added mirror device 604b. Alternatively, mirrored volume 600 may already be configured to mirror data at the time a snapshot request occurs. However, if only two mirror devices 604 are configured at the time a snapshot is requested, and it is desired that mirrored volume 600 continue to mirror data following the snapshot, an additional mirror device 604 may be added as just described.

Once mirror devices 604a-b represent a consistent mirror of the data stored in mirrored volume 600, one of these devices may be broken off or detached from mirrored volume 600 and presented as a separate snapshot volume, which reconfiguration may be performed, for example, by volume server 135. One embodiment of a resulting snapshot configuration is illustrated in FIG. 6B. In the illustrated embodiment, non-mirrored volume 600 corresponds to mirrored volume 600 of FIG. 6A, and block device 604a within volume 600 corresponds to mirror device 604a of FIG. 6A. FIG. 6B also shows newly created snapshot volume 610 including volume block device 612 and block device 604b. Volume block device 612 may be illustrative of volume block device 602, and block device 604b corresponds to mirror device 604b of FIG. 6A. It is noted that if mirrored volume 600 includes more than two mirror devices 604 prior to detaching a mirror device to form a snapshot, mirrored volume 600 may continue to mirror its data among the remaining mirror devices 604 following the snapshot-forming detachment.

In one embodiment, snapshot volume 610 may represent the contents of volume 600 as of the snapshot effective time, and the snapshot effective time may be substantially equivalent to the snapshot request time. For example, if volume 600 was already configured for mirroring at the time a snapshot was requested, volume server 135 may be configured to break off one of the mirror devices 604 with little delay following the request. However, in another embodiment, volume 600 may not be configured for mirroring at the time of the snapshot request, and there may be a delay before the data within volume 600 is mirrored. In such an embodiment, if write activity to volume 600 is suspended while a mirror is created and broken off, the snapshot effective time may be substantially equivalent to the snapshot request time, as the data of volume 600 will not change until the snapshot is complete. However, suspending write activity may unacceptably impact performance of volume 600. As an alternative, write activity to volume 600 may continue until a mirror is detached, in which case the data contents of the resulting snapshot volume 610 may vary from the contents of volume 600 at the snapshot request time, resulting in a snapshot effective time that is a range between the request time and the time of mirror detachment.

It is noted that like any other virtualized block device, mirrored volume 600 may include multiple levels of virtualization, such as are illustrated in FIG. 2. In some such cases, volume server 135 may be configured to exactly replicate the logical or physical block device structure that resides beneath the block device that is being mirrored to form a snapshot. However, in some embodiments, volume server 135 may not use the same device structure to form the snapshot. For example, if high-performance access to snapshot data is not desired, virtualized features such as data striping may be omitted from the mirror device used to form the snapshot.

Figure 7:
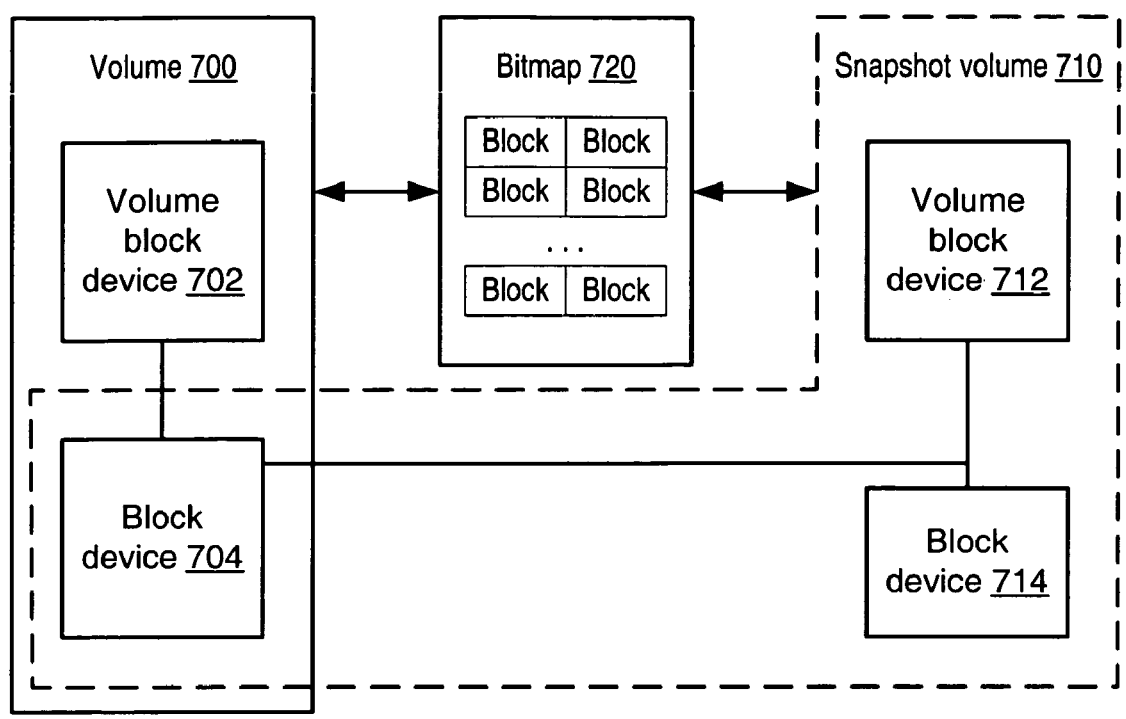
FIG. 7 is a block diagram illustrating one embodiment of a system configured to perform a data snapshot using one variant of a copy-on-write technique.

As noted above, if a given volume is not already mirrored at the time a snapshot is requested, or if an additional mirror device destined to be used within a snapshot volume is added, a possibly lengthy delay may be incurred while the new mirror device is synchronized with existing data. Another technique that may mitigate such a delay, which may be referred to as a copy-on-write snapshot or as a type of "instant snapshot," is illustrated in FIG. 7. In the illustrated embodiment, a volume 700 including a volume block device 702 and a logical or physical block device 704 is shown. Similarly, a snapshot volume 710 including a volume block device 712 and a logical or physical block device 714 is shown. Snapshot volume 710 may also reference block device 704 of volume 700 as described below. A bitmap 720 including entries corresponding to each of the logical blocks mapped by volume block device 702 is also shown.

Volumes 700 and 710 may be illustrative of volumes 105 of FIG. 1, and may be virtualized block devices distributed symmetrically or asymmetrically among one or more volume clients 136 such as illustrated therein. Volume block devices 702 and 712 may be illustrative of similar elements described above. Block devices 704 and 714 may be any logical or physical block device. It is contemplated that in some embodiments, volumes 700 and 710 may include more complex logical structure, including additional block devices not illustrated.

In response to a request to create a snapshot of volume 700 as of a snapshot effective time, snapshot volume 710 may be configured and bitmap 720 may be created, for example by volume server 135. Subsequent to the snapshot effective time, one or more block writes may be directed to volume 700 by a volume consumer. Prior to the targeted blocks being written within volume 700, bitmap 720 is consulted. If a given bit corresponding to a targeted block is not asserted within bitmap 720, the original value of the targeted block may be copied to block device 714 of snapshot volume 710 before the new value is written to the targeted block of block device 704 within volume 700. Subsequent to such block copying, the corresponding bit within bitmap 720 is asserted. If a given corresponding bit is already asserted at the time the write is detected, the targeted block may be written without its original value being copied.

Subsequently, if a volume consumer wishes to read one or more data blocks from snapshot volume 710, bitmap 720 is again consulted. If a bit corresponding to a desired data block is asserted, the data block is read from block device 714 associated with snapshot volume 710. However, if the corresponding bit is not asserted, a write operation subsequent to the snapshot effective time has not yet targeted that block, and the desired data block may be read from block device 704 associated with volume 700. That is, storage associated with snapshot volume 710 may be configured to store the original values, as of the snapshot effective time, only of those blocks that have been modified at least once since the snapshot effective time. If relatively few write operations are directed to volume 700, or the write operations that do occur are directed to relatively few blocks, block storage associated with snapshot volume 710 may be relatively sparsely populated, and the delay in copying blocks to create the snapshot may be mitigated relative to the mirror-and-break-off technique.

It is noted that during the period after snapshot volume 710 has been configured and before any writes have occurred to volume 700, no data blocks may have been copied from block device 704 to block device 714. In such a case, any requests to read data blocks from snapshot volume 710 may be fulfilled by accessing block device 704. Consequently, it may be possible to access data blocks within snapshot volume 710 within a period of time following the snapshot effective time that is on the order of the time required to configure snapshot volume 710 and bitmap 720, rather than the time required to completely mirror volume 700. Generally, this configuration time may be substantially less than the mirroring time, such that snapshot volume 710 may be said to be an "instant snapshot" of volume 700 in terms of the relative delay in making snapshot data available for use.

In some embodiments, the operations to detect a read or write operation directed to a given block of volume 700, determine a value of a corresponding bit in bitmap 720, to copy an original value of a targeted block to snapshot volume 710, and to read a snapshot block from either volume 700 or snapshot volume 710 may be implemented on the client(s) 136 to which volume 700 and/or snapshot volume 710 have been distributed. Alternatively, these operations may be performed by volume server 135, or by another device. If volume 700 or snapshot volume 710 are shared by multiple volume clients 136, the clients may each maintain a copy of bitmap 720 and coordinate to ensure mutual consistency, or the clients may coordinate access to a single instance of bitmap 720. In some embodiments, bitmap 720 may be stored in nonvolatile memory such as described above.

Figure 8:
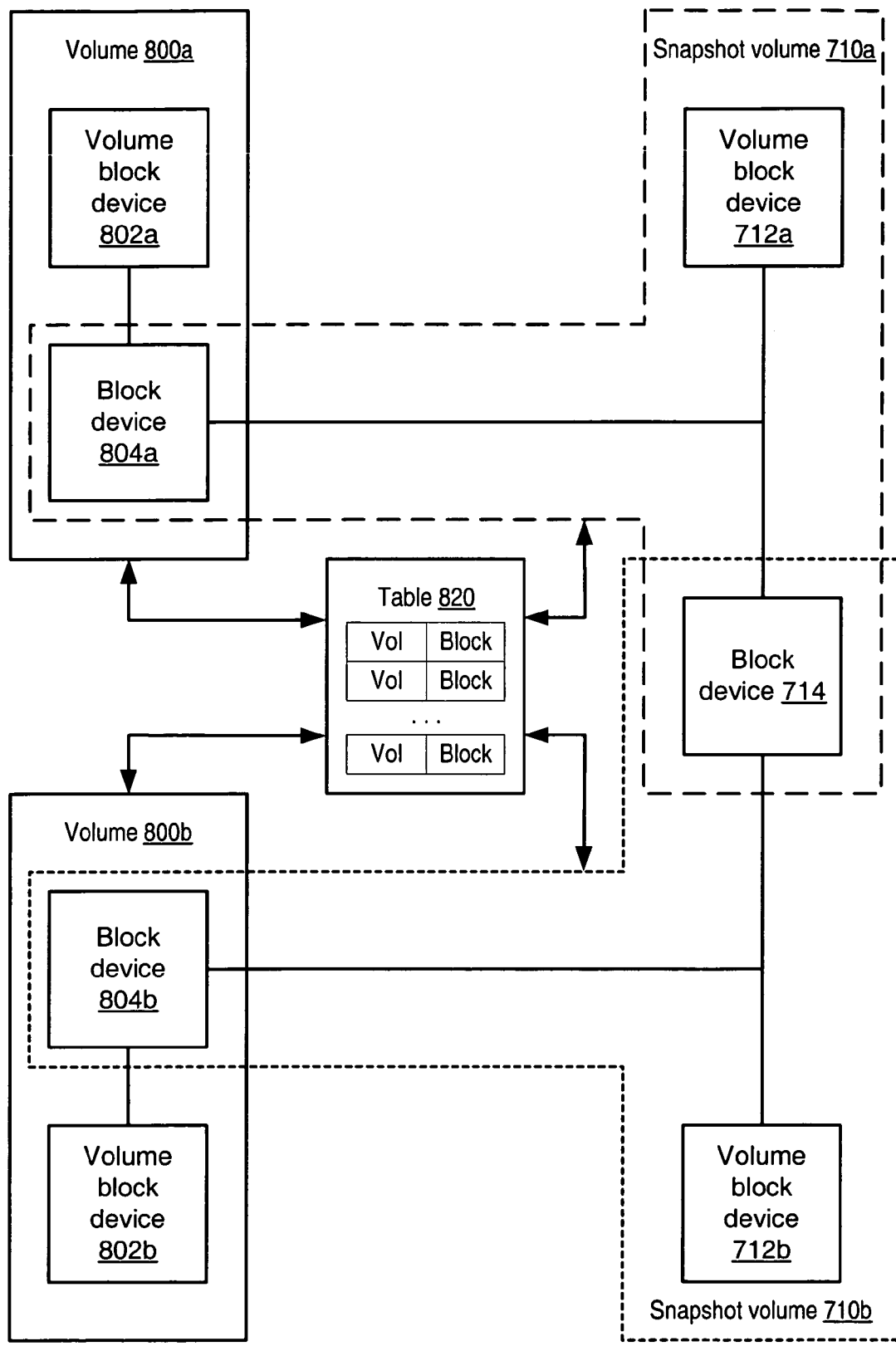
FIG. 8 is a block diagram illustrating one embodiment of a system configured to perform a data snapshot using another variant of a copy-on-write technique.

Another variant of a copy-on-write or instant snapshot is illustrated in FIG. 8. In the illustrated embodiment, a plurality of volumes 800a-b including respective volume block devices 802a-b and respective logical or physical block devices 804a-b are shown. Each of volumes 800a-b is associated with a respective snapshot volume 710a-b. Each of snapshot volumes 710a-b includes a respective volume block interface 712a-b, which may be illustrative of volume block interface 712 as described above in conjunction with the description of FIG. 7. Both snapshot volumes 710 may reference logical or physical block device 714. Additionally, a table 820 including entries that may each specify a given data block and corresponding volume identifier is shown.

As described above, if write activity to a given volume is minimal or directed at relatively few blocks, block storage associated with a corresponding snapshot volume created using the copy-on-write technique may be sparsely populated. Consequently, multiple snapshot volumes may be able share a given underlying block device. In the illustrated embodiment, respective snapshot volumes 710 and table 820 may be allocated in response to a request to create a snapshot of a given volume 800 as of a snapshot effective time, similar to the single-volume case shown in FIG. 7. For example, volume server 135 may configure these elements. In some embodiments, all snapshot volumes 710 that are to share a given block device 714 may be identified at a single time and concurrently configured, whereas in other embodiments, snapshots may be requested for additional volumes 800 and additional snapshot volumes 710 may responsively be configured to share given block device 714 at any time. It is noted that in some embodiments, an arbitrary number of snapshot volumes 710 may share block device 714.

After a given snapshot volume 710 and table 820 have been configured, operation is similar to the embodiment of FIG. 7. However, table 820 is augmented to include information identifying whether an original value of a given block of a given volume 800 has been copied to its respective snapshot volume 710. For example, if volume 800a receives a block write operation after the snapshot effective time, table 820 may be examined to determine whether an entry corresponding to the specified blocks of volume 800a indicates that the original pre-write values of such blocks have not been copied to snapshot volume 710a. The original values of the targeted blocks may then be copied if necessary. Likewise, if snapshot data corresponding to a particular volume 800 is to be read, table 820 may be examined to determine whether a relevant block resides in storage associated with respective snapshot volume 710, e.g., block device 714 or with the particular volume 800, e.g., respective block device 804.

Table 820 may be organized in numerous different ways in various embodiments. In one embodiment, table 820 may simply be multiple instances of bitmap 720, each corresponding to a given volume 800, where the instances may be appended or bit-interleaved to form a single table. In another embodiment, table 820 may include only volume identification and block numbers of blocks that have been copied to respective snapshot volume 710, with omission indicating that blocks have not been copied, or vice versa. In some embodiments, table 820 may include additional information identifying the block number of snapshot volume 710 to which a given block of a corresponding volume 800 has been mapped. For example, in one instance the same numbered block in each of volumes 800a-b may need to be written to snapshot volumes 710a-b due to a write operation. In such an instance, one or both of the blocks may be written to a different block number within underlying block device 714, and table 820 may record the mapping. Alternatively, in some embodiments volume block devices 712a-b may each map the logical blocks of snapshot volumes 710a-b onto block device 714 in any suitable manner without recording mapping information within table 820.

As in the snapshot embodiments described previously, in some embodiments, the operations to detect a read or write operation directed to a given block of volumes 800, to determine a value of a corresponding entry in table 820, to copy an original value of a targeted block to snapshot volume 710, and to read a snapshot block from either a particular volume 800 or snapshot volume 710 may be implemented on the client(s) 136 to which the particular volume 800 and/or snapshot volume 710 have been distributed. Alternatively, these operations may be performed by volume server 135, or by another device.

Figure 9:
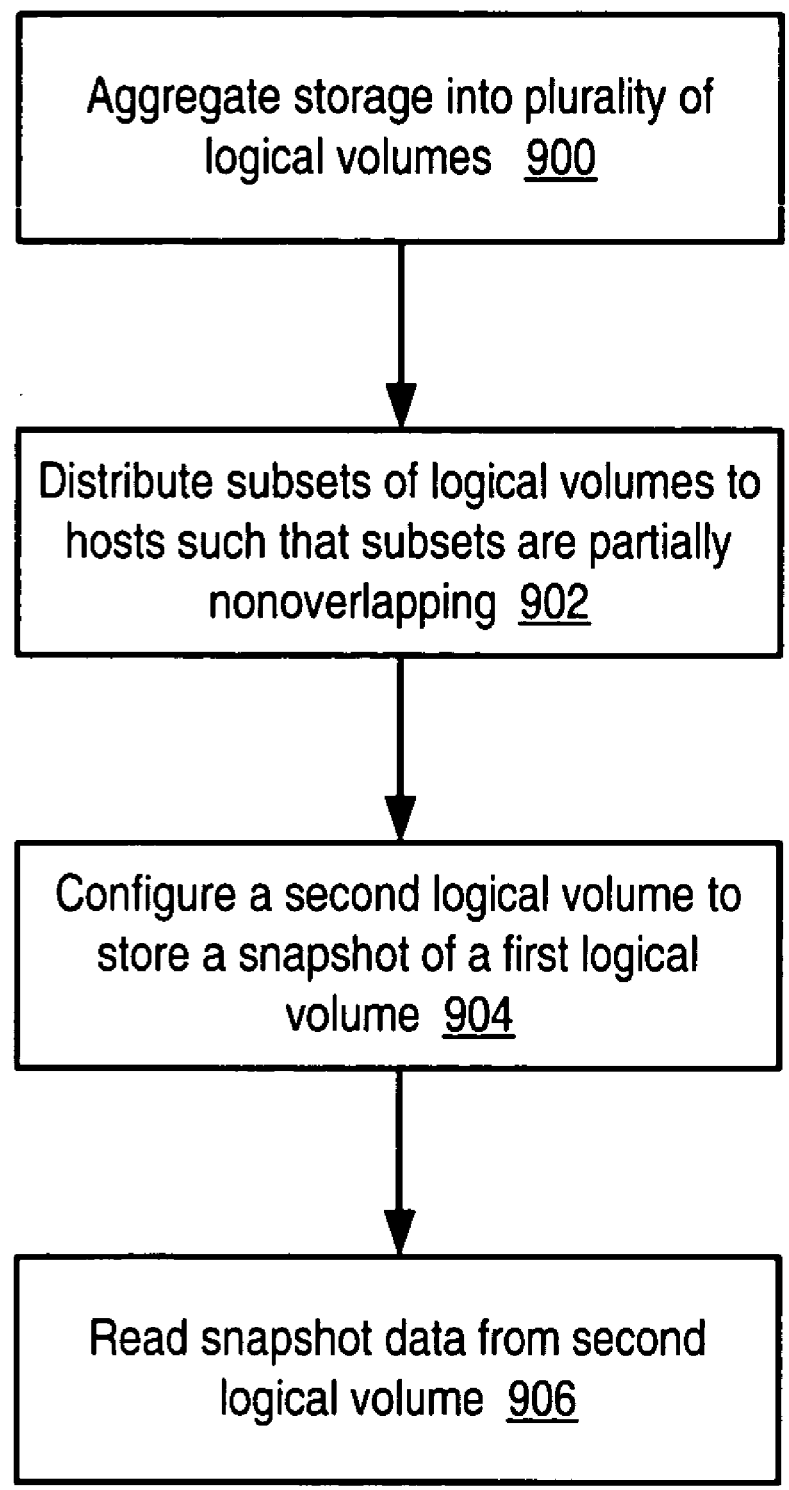
FIG. 9 is a flow diagram illustrating one embodiment of a method of performing snapshots in a system employing asymmetric block virtualization.

One embodiment of a method of performing snapshots in a system employing asymmetric block virtualization is illustrated in FIG. 9. Referring collectively to FIG. 1, FIG. 2, and FIG. 6 through FIG. 9, operation begins in block 900 where storage in a plurality of block devices is aggregated into a plurality of logical volumes, where a particular logical volume includes storage from at least two physical block devices. For example, in one embodiment volume server 135 may organize storage from a plurality of physical block devices 104 into a plurality of virtualized block devices 200 that may be presented as a plurality of volumes 105, where a particular volume 105 may include storage from several physical block devices 104.

Following aggregation of storage into logical volumes, a first subset of the logical volumes may be distributed to a first client computer system, and a second subset of the logical volumes may be distributed to second client computer system, where the first and second subsets are at least partially nonoverlapping (block 902). For example, volume manager 135 may distribute one volume 105A to a particular volume client 136A and a second volume 105B to another volume client 136B.

After a first logical volume has been distributed to a client computer system, a second logical volume may be configured to store a respective snapshot of the first logical volume (block 904). For example, the first logical volume 105 may be reconfigured by volume manager 135 to perform the mirror-and-break-off snapshot technique described above. Alternatively, a variant of the copy-on-write technique described above may be employed, or any other snapshot technique suitable for forming a fixed image of the first logical volume at or about a snapshot effective time.

Subsequent to storing a snapshot of the first logical volume in the second logical volume, snapshot data may be read (block 906). For example, an application may interact with the second logical volume to write snapshot data to an archival storage medium.

Figure 10:
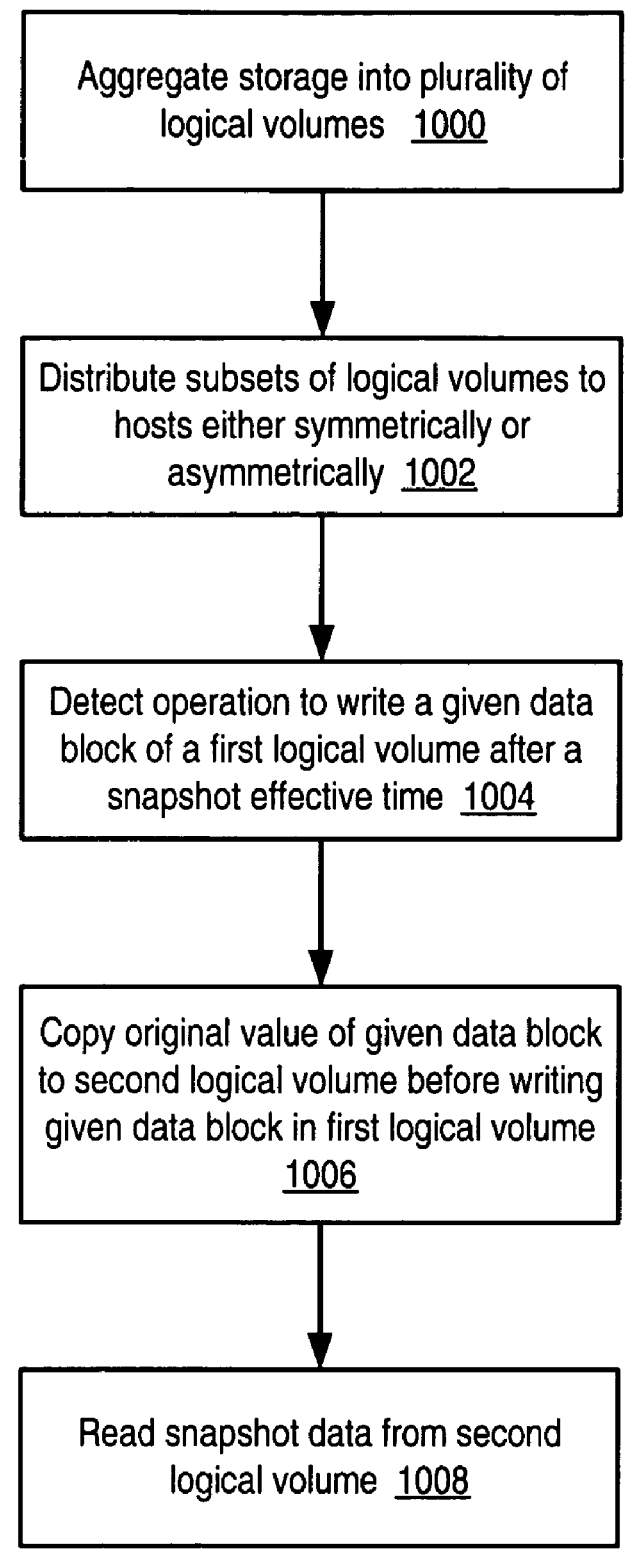
FIG. 10 is a flow diagram illustrating one embodiment of a method of performing instant snapshots in a system employing symmetric or asymmetric block virtualization.

One embodiment of a method of performing instant snapshots in a system employing symmetric or asymmetric block virtualization is illustrated in FIG. 10. Referring collectively to FIG. 1, FIG. 2, FIG. 6 through FIG. 8 and FIG. 10, operation begins in block 1000 where storage in a plurality of block devices is aggregated into a plurality of logical volumes, where a particular logical volume includes storage from at least two physical block devices. For example, in one embodiment volume server 135 may organize storage from a plurality of physical block devices 104 into a plurality of virtualized block devices 200 that may be presented as a plurality of volumes 105, where a particular volume 105 may include storage from several physical block devices 104.

Following aggregation of storage into logical volumes, a first subset of the logical volumes may be distributed to a first client computer system, and a second subset of the logical volumes may be distributed to second client computer system (block 1002). The first and second subsets may completely overlap (i.e., symmetric distribution), or may be at least partially nonoverlapping (i.e., asymmetric distribution). For example, volume manager 135 may distribute one volume 105A to each volume client 136, or may distribute volume 105A to a particular volume client 136A and a second volume 105B to another volume client 136B, or any other combination of clients.

After a first logical volume has been distributed to a client computer system, a second logical volume may be configured may be configured to store a respective snapshot of the first logical volume as of a snapshot effective time, using an instant snapshot technique. First, an operation to write a given data block of the first logical volume after the snapshot effective time may be detected (block 1004). In response to this detection, the original value of the given data block prior to the write operation may be copied to the second logical volume before the given data block is written in the first logical volume (block 1006). For example, bitmap 720 or table 820 may be used to track whether an original value of a given data block has been written to snapshot volume 710.

Following storage of the snapshot, snapshot data may be read (block 1008). For example, bitmap 720 or table 820 may be consulted to determine whether a given data block of the snapshot has been copied to snapshot volume 710 or still resides on the first logical volume. The snapshot data block may then be read from the appropriate device.

Exemplary Computing System Embodiments

Figure 11:
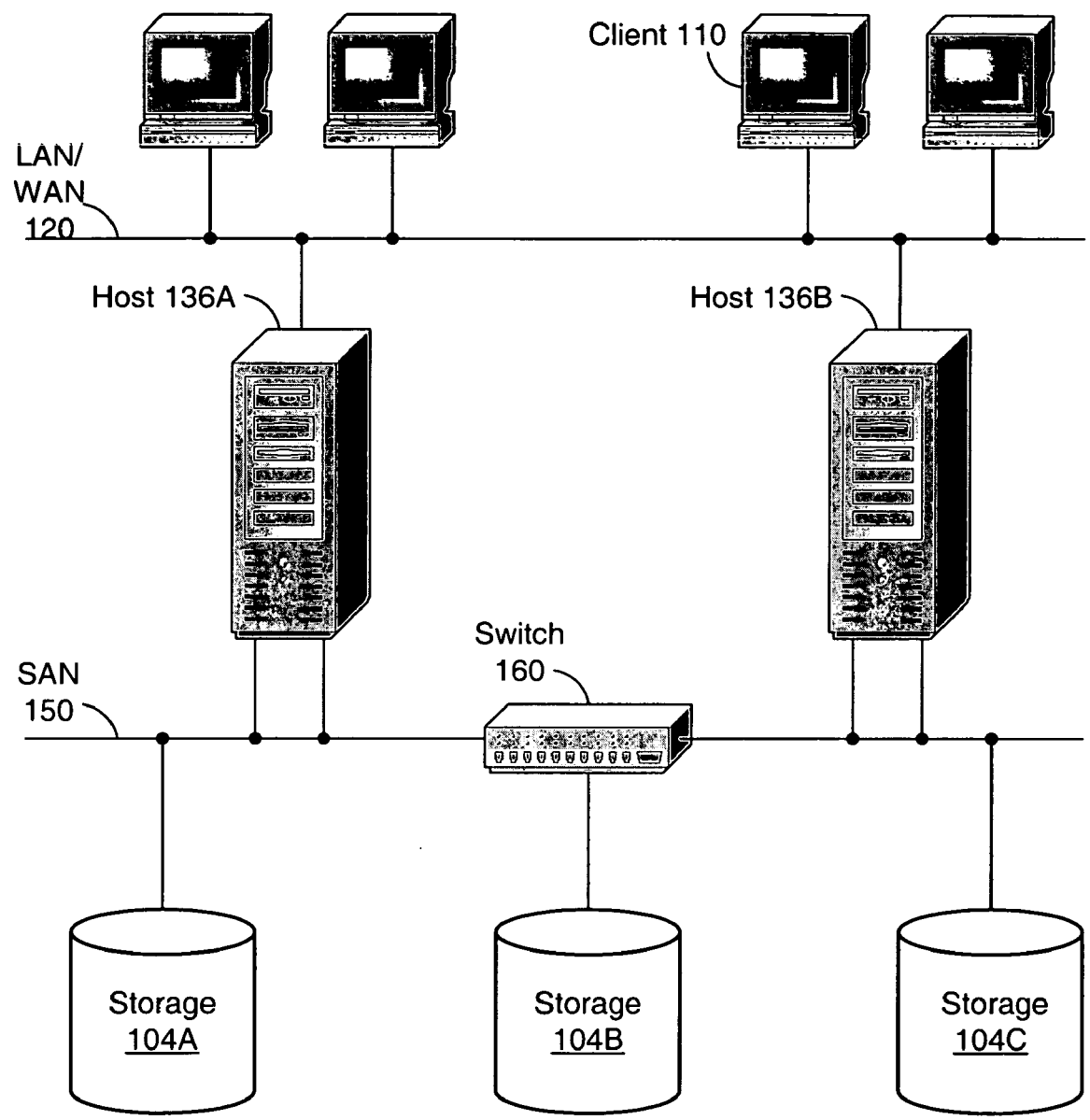
FIG. 11 is a block diagram illustrating one embodiment of a computing system.
Figure 14:
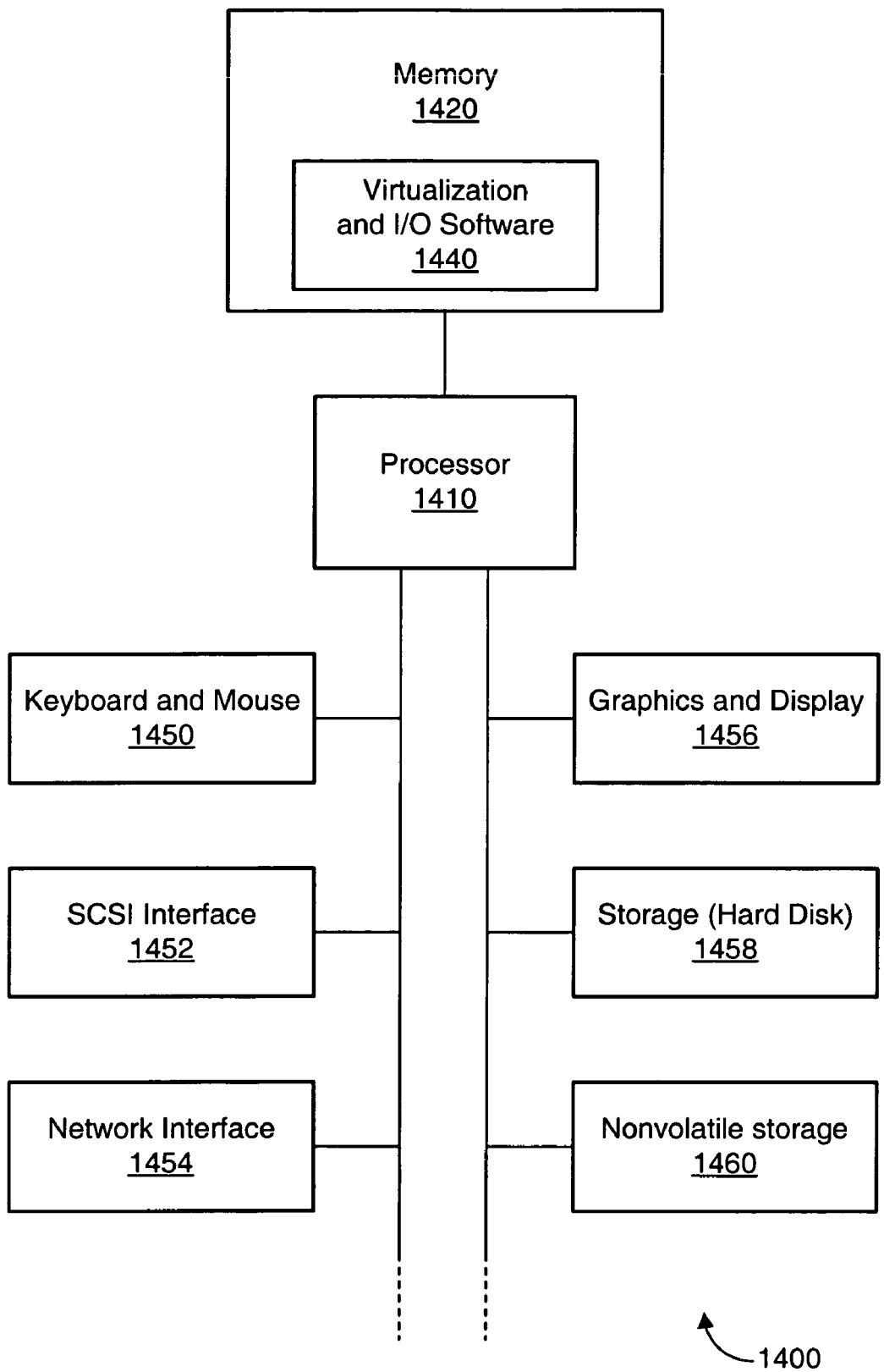
FIG. 14 is a block diagram illustrating one embodiment of an individual computer system.

The block virtualization, mirroring, and snapshot techniques described above may be implemented in a number of different computing system architectures. FIG. 11 illustrates an example of a computing system 250 according to one embodiment. The members of the computing system 250 may include one or more volume clients 136 such as volume client 136A and volume client 136B. As members of computing system 250, volume clients 136A and 136B may be referred to "nodes." Volume clients 136A and 136B, which may typically be some type of application, data or file server, may operate independently of each other, or they may interoperate to form some manner of cluster. Volume clients 136A and 136B are typically individual computer systems having some or all of the software and hardware components well known to those having skill in the art. FIG. 14 (described below) illustrates some of the features common to such computer systems. In support of various applications and operations, volume clients 136A and 136B may exchange data over various communication links, for example, network 120, typically a local area network (LAN), e.g., an enterprise-wide intranet, or a wide area network (WAN) such as the Internet. Additionally, network 120 provides a communication path for various client computer systems 110 to communicate with volume clients 136A and 136B. In addition to network 120, volume clients 136A and 136B may communicate with each other over a private network (not shown) in one embodiment.

Other elements of computing system 250 may include a storage area network (SAN) 150, SAN switch 160, and block storage devices 104. As described previously, storage devices (e.g., 104A, 104B, and 104C) may include various devices such as a tape library (typically including one or more tape drives), a group of disk drives (i.e., "just a bunch of disks" or "JBOD"), an intelligent storage array, and other suitable storage means. As shown in FIG. 11, both volume clients 136A and 136B are coupled to SAN 150. SAN 150 is conventionally a high-speed network that allows the establishment of direct connections between storage devices 104 and volume clients 136A and 136B. Thus, SAN 150 is shared between the clients and allows for the sharing of storage devices between the clients to provide greater availability and reliability of storage.

Although volume clients 136A and 136B are shown connected to storage devices 104A, 104B, and 104C through SAN switch 160 and SAN 150, this need not be the case. Shared resources may be directly connected to some or all of the clients in the computing system, and computing system 250 need not include a SAN. Alternatively, volume clients 136A and 136B can be connected to multiple SANs. Additionally, SAN switch 160 can be replaced with a SAN router, a SAN hub, or some type of storage appliance.

In various embodiments, block virtualization such as configured by volume server 135 can generally be implemented at the client level, e.g., volume clients 136A and 136B, at the storage device level, e.g., intelligent disk array 190, and/or at the appliance level, e.g., SAN switch 160. Client-based storage virtualization is perhaps the most common virtualization solution and is typically either packaged with the client's operating system or made available as an add-on product. Client-based virtualization may allow administrators to access advanced storage management functions such as mirroring, RAID sets, redundant pathing, and hot backups (by using mirror splits or snapshots as described above). However, client-based virtualization may add undesirable overhead to the client system. Furthermore, client-based virtualization may complicate global storage management by requiring management on a client-by-client basis.

Storage-based virtualization may provide an alternative to client-based virtualization in various embodiments. Storage-based virtualization solutions typically implement intelligent storage devices such as intelligent disk arrays that implement virtualization functions. For example, such devices can allow for movement between different RAID groups without data loss, as well as automatic migration of data from one RAID group to another based upon the frequency of data access. In addition, these products typically permit the creation of multiple data mirrors, which provide additional availability when one of the mirrors is split for hot backups. Storage-based virtualization can also be advantageous in providing the flexibility to modify LUN (logical unit) size, the ability to have multiple clients see the same LUNs (which is particularly critical with high availability clustering), and remote replication. However, the more heterogeneous the storage devices, the more likely it is that there are multiple virtualization schemes with which a client-level or client-computer-system level application or user will have to contend.

Still another alternative is appliance-based virtualization. Appliance-based virtualization provides users with virtualization between the clients and the storage, allowing for the same level of control and centralization across the storage architecture. There are generally two kinds of appliance-based virtualization products: in-band and out-of-band. An in-band virtualization appliance is physically located between the client and the storage. The appliance takes the disk requests from the client and fulfills the client's request from the storage attached to the other side of the appliance. This functionality is essentially transparent to the client because the appliance presents itself as disk. The physical location of the appliance is the primary difference between out-of-band and in-band appliances. Out-of-band appliances logically present themselves as if they are located between the client and storage, but they actually reside to the side. This is accomplished with the installation of a driver under the client's disk driver. The appliance driver then receives logical to physical block mappings from the appliance. In providing a common virtualization scheme for all storage devices 104, appliance-based virtualization may simplify the presentation and use of virtual storage devices by client computer systems 110.

Figure 12:
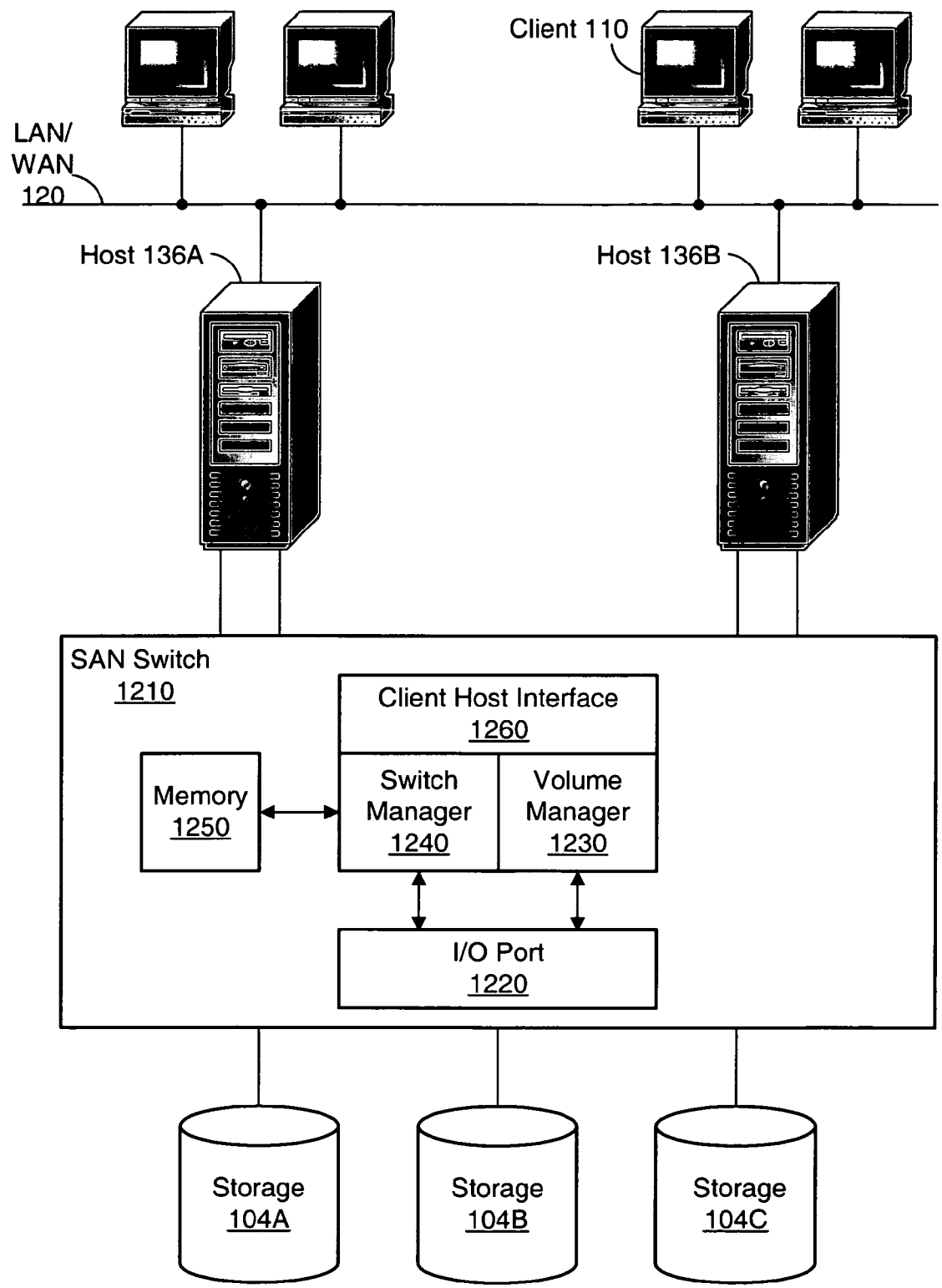
FIG. 12 is a block diagram illustrating one embodiment of a computing system configured to perform switch-based block virtualization.

FIG. 12 illustrates an example of a computing system 350 according to one embodiment. In the example of FIG. 12, computing system 350 includes two volume clients 136A and 136B. Both volume clients 136A and 136B execute one or more application programs respectively. Such applications can include, but are not limited to, database administration systems (DBMS), file servers, application servers, web servers, backup and restore software, customer relationship management software, and the like. The applications and other software not shown, e.g., operating systems, file systems, and applications executing on client computer systems 110 can initiate or request I/O operations against storage devices 104. These I/O operations typically include read and write operations to logical or virtual devices such as volumes, virtual LUNs, and/or virtual disks designed to appear and operate as SCSI LUNs.

SAN switch 1210 is an example of a storage appliance that can implement the systems and methods of the present invention. Other devices that can be utilized include a variety of devices such as general network switches, switch-routers, routers, router-switches and other storage network devices. The term "switch" is used in this specification to describe equipment used to direct information over a network based on address information. Those skilled in the art will understand that such equipment includes, for example, switches and routers. SAN switch 1210 is responsible for creating and managing the virtualization of storage devices 104A, 104B, and 104C. In one example, SAN switch 1210 presents the virtual disks to volume clients 136 and client computer systems 110.

In support of the virtualization scheme, SAN switch 1210 may include a volume manager 1230, switch manager 1240, client host interface 1260, memory 1250, and I/O port 1220: Although only one I/O port is illustrated, SAN switch 1210 typically includes multiple I/O ports, e.g., at least one port for each device attached to the switch. Moreover, the elements shown are merely illustrative, and those having ordinary skill in the are will recognize a variety of other architectures that can be used. For example, each port can have one or more associated processors for executing software performing volume manager 1230, switch manager 1240, and client host interface 1260 functionality. Data can be transmitted among ports using a switching fabric (not shown) implementing a crossbar, single-bus, multiple-bus, or shared-memory architecture. Additionally, volume manager 1230, switch manager 1240, and client host interface 1260 are each typically implemented as software, microcode, or some combination of the two executing on a general-purpose microprocessor, general-purpose microcontroller, ASIC, PLD, FPGA, or the like. In this manner, the hardware and/or software operates as an I/O processor. In some embodiments, the functionality of two or more of volume manager 1230, switch manager 1240, and client host interface 1260 is implemented in the same software and/or hardware. For example, volume manager 1230 and switch manager 1240 might be combined into a single software package. Additionally, there can be more than one instantiation of each of volume manager 1230, switch manager 1240, and client host interface 1260 in some implementations.

Volume manager 1230 enables physical resources configured in the computing system to be managed as logical devices. An example of software that performs some or all of the functions of volume manager 1230 is the VERITAS Volume Manager™ product provided by VERITAS Software Corporation. While volume manager 1230 organizes storage devices 104A, 104B, and 104C into one or more volumes, switch manager 1240 is responsible for presenting one or more volumes as one or more virtual disks. In one example, there is a one-to-one correspondence between volumes and virtual disks; however, other mappings may be used as well. In some embodiments, volume manager 1230 and switch manager 1240 collectively perform the functions of volume server 135 described above.

In one embodiment, switch manager 1240 maintains SAN switch 1210 data objects such as access control lists, quality of service information, virtual disk information and route information. Some or all of the information maintained by switch manager 1240 can be stored in memory 1250, which can be a disk drive, a random access memory, a flash memory, or some other suitable storage medium. A virtual disk may be created by defining its SCSI characteristics and its mapping to a volume established by volume manager 1230. SCSI characteristics may include block size, device size, inquiry data, and mode pages. In one embodiment, the virtual disk is a computing system wide entity in that its definition does not bind it to any specific appliance node. A route to the device can also be created. In general, a route binds a virtual disk to a specific LUN on a specific port. Switch manager 1240 receives and processes one or more I/O interface commands (e.g., SCSI commands), as part of its virtual disk maintenance functionality.

A SCSI target device contains one or more logical units (LUNs) and target ports (sometimes referred to as targets) and receives device service and task management requests for processing. A logical unit is an externally addressable entity within a target that implements a SCSI device model and contains a device server. A device server is an object within a logical unit that executes SCSI tasks according to the rules of task management. Devices which comply with SCSI standards may include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices may be used as shared resources and shared data resources.

Switch manager 1240 may utilize volume information from volume manager 1230 and store it along with the information it maintains in memory 1250. For example, since volume manager 1230 is typically responsible for creating and maintaining snapshot volumes, it can provide information about a snapshot volume to switch manager 1240. Switch manager 1240 in turn stores the information in a way that is accessible using one or more I/O interface commands. For example, switch manager 1240 includes the virtual device information from volume manager 1230 in inquiry data that is accessible using the SCSI-3 INQUIRY command. In this way, additional information about the virtual disks and their related volumes is made accessible to volume clients 136A and 136B as well as client computer systems 110. For example, an application operating on volume client 136, e.g., a backup and restoration application, can query SAN switch 1210 using a SCSI-3 INQUIRY to gather information about the relationship among virtual disks and/or corresponding volumes.

Client host interface 1260 provides a user interface, e.g., a command line interface or a graphical user interface, for the management of volume manager 1230, switch manager 1240, and/or other features of SAN switch 1210. Additionally, client host interface 1260 can serve as an additional interface for accessing and/or modifying information stored in memory 1250, such as the aforementioned virtual device information.

Figure 13:
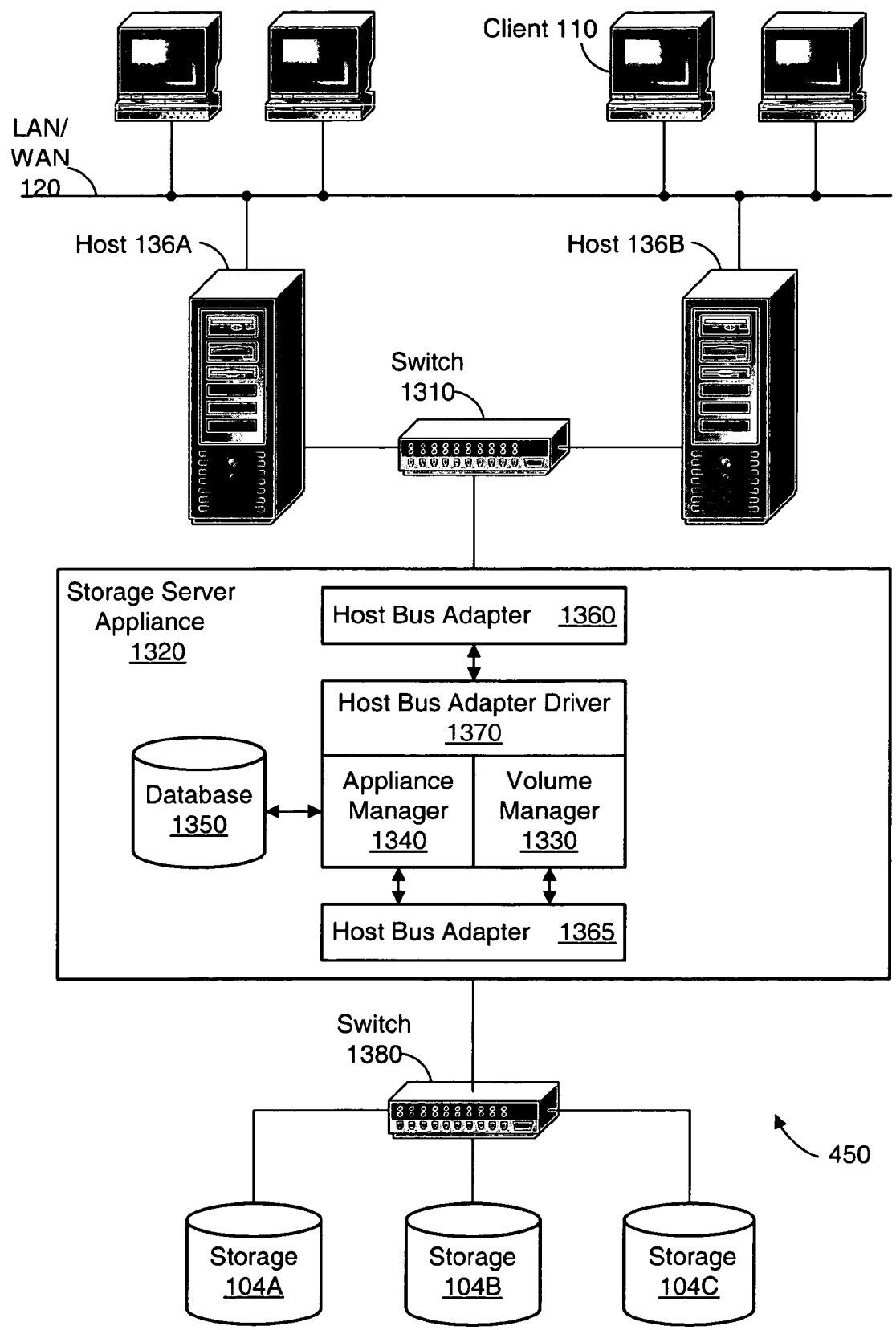
FIG. 13 is a block diagram illustrating one embodiment of a computing system configured to perform appliance-based block virtualization.

FIG. 13 illustrates an embodiment in which storage virtualization is maintained by a storage server appliance 1320. In general, storage server appliance 1320 differs from SAN switch 1210 in that SAN switch 1210 may be a specialized piece of hardware, while storage server appliance 1320 is typically a conventional computer system, e.g., a server, that operates additional software to provide storage server appliance functionality. An example of the type of software used to provide such functionality on conventional server hardware is the VERITAS ServPoint™ Appliance Software for SAN product provided by VERITAS Software Corporation. To enhance storage server appliance 1320's integration with computing system 450, e.g., to provide additional virtualization information to applications executing on volume clients 136A and 136B, the systems, methods, and software of the present invention can be utilized.

Computing system 460 may utilize two switches 1310 and 1380 to provide front side and back side storage networks. Switch 1380 links all of the storage devices 104A, 104B, and 104C to the storage server appliance 1320. Similarly, switch 1310 links all of the storage clients, e.g., volume clients 136A and 136B, to storage server appliance 1320. For added fault tolerance, multiple switches and data paths can be used as is well known to those having ordinary skill in the art.

Switch 1310 is coupled to host bus adapter 1360 of storage server appliance 1320. Host bus adapter 1360 is typically a SCSI or Fibre Channel adapter supporting a high speed/bandwidth connection. Host bus adapter driver 1370 supports I/O operations from storage clients, and interface with appliance manager 1340 and volume manager 1330. In general, appliance manager 1340 and volume manager 1330 operate in much the same manner as switch manager 1240 and volume manager 1230. In particular, appliance manager 1340 maintains data objects such as access control lists, quality of service information, virtual disk information (including the specialized information described above) and route information. Such information is stored in database 1350, which is typically stored on one or more disk drives local to storage server appliance 1320. In this manner, certain hardware and/or software of storage server appliance 1320 may operate as an I/O processor.

FIG. 14 illustrates a block diagram of a typical computer system 1400 for implementing embodiments of the systems and methods described above for distributed block virtualization. For example, computer system 1400 can be illustrative of one of the previously described cluster nodes, i.e. of volume clients 136. Computer system 1400 may also be illustrative of clients 110. Computer system 1400 includes a processor 1410 and a memory 1420 coupled by communications bus 1405. Processor 1410 can be a single processor or a number of individual processors working together. Memory 1420 is typically random access memory (RAM), or some other dynamic storage device, and is capable of storing instructions to be executed by the processor, e.g., virtualization and I/O software 1440. Memory 1420 is also used for storing temporary variables or other intermediate information during the execution of instructions by the processor 1410.

Computer system 1400 may also include devices such as keyboard & mouse 1450, SCSI interface 1452, network interface 1454, graphics & display 1456, hard disk 1458, and other nonvolatile storage 1460, all of which are coupled to processor 1410 by communications bus 1407. In various embodiments, nonvolatile storage 1460 may include optical media devices such as read-only or writable CD or DVD, solid-state devices such as nonvolatile RAM, or any other suitable type of nonvolatile storage. It will be apparent to those having ordinary skill in the art that computer system 1400 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 1440 may comprise program instructions executable, for example by one or more processors 1410, to perform any of the functions or methods described above such as block virtualization, volume management, storage mirroring, snapshots, etc. Also, in some embodiments software 1440 can be provided to the computer system via a variety of computer-accessible media including electronic media (e.g., flash memory), magnetic storage media (e.g., hard disk 1458, a floppy disk, etc.), optical storage media (e.g., CD-ROM 1460), and communications media conveying signals encoding the instructions (e.g., via a network coupled to network interface 1454). In some embodiments, separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

It is noted that in any of the distributed block virtualization architectures described in conjunction with FIGS. 1-14, replication of distributed block virtualization may be used. Replication techniques may include, for example, distributed logging, snapshots and FMR3 (Fast Mirror Resync of VERITAS Volume Manager from VERITAS Software Corporation) snap-points. In various embodiments, it is contemplated that replication techniques may be used with either symmetric or asymmetric distributed block virtualization, with or without snapshots, mirroring, or other techniques.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system comprising:
a volume server;
a first and a second host computer system; and
a plurality of physical block devices;
wherein the volume server is configured to:
aggregate storage in the plurality of physical block devices into a plurality of logical volumes, wherein a particular logical volume includes storage from at least two physical block devices;
make a first subset of the logical volumes available to said first host computer system for input/output; and
make a second subset of the logical volumes available to said second host computer system for input/output;
wherein the volume server is further configured to distribute a volume description of a given one of said logical volumes to a volume client on a given one of said first and second host computer systems to make said given volume available to said given host computer system for input/output, wherein said volume description indicates storage mapping relationships between said given logical volume and ones of said physical block devices included in said given logical volume;
wherein, after said given logical volume has been made available to said given host computer system by said volume server, said given host computer system is operable to read and write data to said given logical volume without interacting with said volume server;
wherein said first subset and said second subset are at least partially nonoverlapping;
wherein said given logical volume is configured as a mirrored logical volume including a plurality of copies of a given data block; and
wherein the system further comprises recovery functionality configured to place two of said plurality of copies of said given data block in a mutually consistent state if said two copies of said given data block are detected to be possibly inconsistent.

2. The system as recited in claim 1, wherein each said copy of said given data block within said mirrored logical volume is stored on a respective block device.

3. The system as recited in claim 1, further comprising a write log configured to maintain a log of write operations and corresponding write data issued to said respective block devices, and wherein placing said possibly inconsistent copies in a mutually consistent state includes reissuing one or more selected ones of said write operations from said write log.

4. The system as recited in claim 3, wherein said write log is stored in a nonvolatile storage medium.

5. The system as recited in claim 1, further comprising a write block list configured to indicate recently written data blocks of said mirrored logical volume, and wherein placing said possibly inconsistent copies in a mutually consistent state includes identifying data blocks indicated by said write block list, and for an indicated block, selecting a particular one of said copies of said indicated block and copying the selected value to each other copy of said indicated block.

6. The system as recited in claim 5, wherein said write block list is a bitmap, and wherein each entry of said bitmap corresponds to a respective region including one or more data blocks of said mirrored logical volume.

7. The system as recited in claim 5, wherein said write block list is stored in a nonvolatile storage medium.

8. The system as recited in claim 1, wherein said given logical volume is configured by said volume server as a virtualized block device comprising a plurality of logical block devices hierarchically configured to implement a plurality of virtualization functions, wherein said storage mapping relationships included in said volume description indicate storage mapping relationships among said hierarchically configured plurality of logical block devices, and wherein the virtualization functions are implemented by the given logical volume transparently to the volume client.

9. A method comprising:
  a volume server aggregating storage in a plurality of physical block devices into a plurality of logical volumes, wherein a particular logical volume includes storage from at least two physical block devices;
  said volume server making a first subset of the logical volumes available to a first host computer system for input/output;
  said volume server making a second subset of the logical volumes available to a second host computer system for input/output, wherein making a given one of said logical volumes available to a given one of said first and second host computer systems comprises distributing a volume description of said given logical volume to a volume client on said given host computer system, wherein said volume description indicates storage mapping relationships between said given logical volume and ones of said physical block devices included in said given logical volume; and
  subsequent to said volume server making said given logical volume available to said given host computer system, said given host computer system reading and writing data to said given logical volume without interacting with said volume server;
  wherein said first subset and said second subset are at least partially nonoverlapping;
  wherein said given logical volume is configured as a mirrored logical volume including a plurality of copies of a given data block; and
  wherein the method further comprises:
    detecting that two of said plurality of copies of said given data block are possibly inconsistent; and
    responsively placing said possibly inconsistent copies in a mutually consistent state.

10. The method as recited in claim 9, wherein each said copy of said given data block within said mirrored logical volume is stored on a respective block device.

11. The method as recited in claim 9, further comprising maintaining a log of write operations and corresponding write data issued to said respective block devices, and wherein placing said possibly inconsistent copies in a mutually consistent state includes reissuing one or more selected ones of said write operations from said write log.

12. The method as recited in claim 11, further comprising storing said log in a nonvolatile storage medium.

13. The method as recited in claim 9, further comprising indicating recently written data blocks of said mirrored logical volume in a write block list, and wherein placing said possibly inconsistent copies in a mutually consistent state includes identifying data blocks indicated by said write block list, and for an indicated block, selecting a particular one of said copies of said indicated block and copying the selected value to each other copy of said indicated block.

14. The method as recited in claim 13, wherein said write block list is a bitmap, and wherein each entry of said bitmap corresponds to a respective region including one or more data blocks of said mirrored logical volume.

15. The method as recited in claim 13, further comprising storing said write block list in a nonvolatile storage medium.

16. The method as recited in claim 9, further comprising said volume server configuring said given logical volume as a virtualized block device comprising a plurality of logical block devices hierarchically configured to implement a plurality of virtualization functions, wherein said storage mapping relationships included in said volume description indicate storage mapping relationships among said hierarchically configured plurality of logical block devices, and wherein the virtualization functions are implemented by the given logical volume transparently to the volume client.

17. A computer-accessible storage medium comprising program instructions, wherein said program instructions are executable to implement:
  a volume server aggregating storage in a plurality of physical block devices into a plurality of logical volumes, wherein a particular logical volume includes storage from at least two physical block devices;
  said volume server making a first subset of the logical volumes available to a first host computer system for input/output; and
  said volume server making a second subset of the logical volumes available to a second host computer system for input/output, wherein making a given one of said logical volumes available to a given one of said first and second host computer systems comprises distributing a volume description of said given logical volume to a volume client on said given host computer system, wherein said volume description indicates storage mapping relationships between said given logical volume and ones of said physical block devices included in said given logical volume;
  wherein subsequent to said volume server making said given logical volume available to said given host computer system, said given host computer system is operable to read and write data to said given logical volume without said volume server interacting with said given host computer system;
  wherein said first subset and said second subset are at least partially nonoverlapping;
  wherein said given logical volume is configured as a mirrored logical volume including a plurality of copies of a given data block; and
  wherein said program instructions are further executable to:
    detect that two of said plurality of copies of said given data block are possibly inconsistent; and
    responsively place said possibly inconsistent copies in a mutually consistent state.

18. The computer-accessible storage medium as recited in claim 17, wherein each said copy of said given data block within said mirrored logical volume is stored on a respective block device.

19. The computer-accessible storage medium as recited in claim 17, wherein said program instructions are further executable to maintain a log of write operations and corresponding write data issued to said respective block devices, and wherein placing said possibly inconsistent copies in a mutually consistent state includes reissuing one or more selected ones of said write operations from said write log.

20. The computer-accessible storage medium as recited in claim 19, wherein said log is stored in a nonvolatile storage medium.

21. The computer-accessible storage medium as recited in claim 17, wherein said program instructions are further executable to indicate recently written data blocks of said mirrored logical volume in a write block list, and wherein placing said possibly inconsistent copies in a mutually consistent state includes identifying data blocks indicated by said write block list, and for an indicated block, selecting a particular one of said copies of said indicated block and copying the selected value to each other copy of said indicated block.

22. The computer-accessible storage medium as recited in claim 21, wherein said write block list is a bitmap, and wherein each entry of said bitmap corresponds to a respective region including one or more data blocks of said mirrored logical volume.

23. The computer-accessible storage medium as recited in claim 21, wherein said write block list is stored in a nonvolatile storage medium.

24. The computer-accessible storage medium as recited in claim 17, wherein said program instructions are further executable to implement said volume server configuring said given logical volume as a virtualized block device comprising a plurality of logical block devices hierarchically configured to implement a plurality of virtualization functions, wherein said storage mapping relationships included in said volume description indicate storage mapping relationships among said hierarchically configured plurality of logical block devices, and wherein the virtualization functions are implemented by the given logical volume transparently to the volume client.

* * * * *